(12) United States Patent
Shibata et al.

(10) Patent No.: US 10,210,248 B2
(45) Date of Patent: Feb. 19, 2019

(54) COMPUTER-READABLE RECORDING MEDIUM, DISPLAY CONTROL METHOD, AND INFORMATION PROCESSING DEVICE

(71) Applicant: FUJITSU LIMITED, Kawasaki-shi, Kanagawa (JP)

(72) Inventors: Ryu Shibata, Fuji (JP); Tomotsugu Mochizuki, Shizuoka (JP); Norikatsu Nishizawa, Shizuoka (JP); Satoshi Kasai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 15/345,626

(22) Filed: Nov. 8, 2016

(65) Prior Publication Data

US 2017/0161285 A1 Jun. 8, 2017

(30) Foreign Application Priority Data

Dec. 4, 2015 (JP) .................................. 2015-238086

(51) Int. Cl.
*G06F 17/30* (2006.01)
*G06Q 10/10* (2012.01)
*H04L 12/58* (2006.01)
*H04L 29/12* (2006.01)
*G06F 3/0482* (2013.01)

(52) U.S. Cl.
CPC ........ *G06F 17/3071* (2013.01); *G06F 3/0482* (2013.01); *G06F 17/30684* (2013.01); *G06Q 10/107* (2013.01); *H04L 51/34* (2013.01); *H04L 61/1564* (2013.01); *G06F 17/30861* (2013.01)

(58) Field of Classification Search
CPC ........... G06F 17/3071; G06F 17/30684; G06F 17/30861; G06F 3/0482; G06Q 10/107; H04L 51/34; H04L 61/1564
See application file for complete search history.

(56) References Cited

U.S. PATENT DOCUMENTS

| | | | |
|---|---|---|---|
| 6,836,772 B1 | 12/2004 | Nishimura | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2009/0043860 A1* | 2/2009 | Aoki | G06Q 10/107 709/206 |
| 2010/0074424 A1* | 3/2010 | Ito | H04M 15/00 379/142.04 |

FOREIGN PATENT DOCUMENTS

| | | | | |
|---|---|---|---|---|
| EP | 2665230 A1 * | 11/2013 | | H04L 51/12 |
| JP | 11-341208 | 12/1999 | | |
| JP | 2000-132553 | 5/2000 | | |
| JP | 2004-304719 | 10/2004 | | |
| JP | 2005-284454 | 10/2005 | | |
| JP | 2007-249584 | 9/2007 | | |
| JP | 2008-193538 | 8/2008 | | |

* cited by examiner

*Primary Examiner* — Jay A Morrison
(74) *Attorney, Agent, or Firm* — Fujitsu Patent Center

(57) ABSTRACT

A mail server displays a list of mail addresses of the sources of mails matching with an extraction condition for inappropriate mails, the list being classified into levels which are divided according to the transmission status of mails matching with the extraction condition for each mail address. Then, in response to the selection of one of the mail addresses from the displayed list, the mail server displays the transition of the transmission status of the mails which match with the extraction condition and have the selected mail address.

6 Claims, 20 Drawing Sheets

FIG.3

| CATEGORY | RELEVANT KWs | EXCLUDED KWs | IMPERMISSIBLE KWs |
|---|---|---|---|
| INFORMATION LEAK | CLIENT COMPANY, SECRET, ... | ESTIMATE, ... | TRADE SECRET, ... |
| MENTAL ABUSE | DIE, FOOL, DUMB, CRAP, IDIOT, ... | APPLE, ... | SCUM, ... |
| POWER HARASSMENT | QUOTA, FOOL, ... | SALARY, ... | GOLDBRICKER, ... |
| SEXUAL HARASSMENT | PRETTY, PREGNANT, WEDDING, ... | CELEBRATION, ... | BAD-LOOKER, ... |

FIG.6

MAIL TEXT (MENTAL ABUSE)

XXX,
DUDE, WHEN WILL YOU LEARN HOW TO DO THE JOB?
YOUR PRESENCE IN THE COMPANY IS NOTHING BUT A HINDRANCE.
YOU ARE NOT NEEDED. DIE.

⬇ LEARNING

EXTRACTION OF KEYWORDS CAUSING MENTAL ABUSE
· DIE
· DUDE

⬇ REGISTRATION

| CATEGORY | RELEVANT KWs | EXCLUDED KWs | IMPERMISSIBLE KWs |
|---|---|---|---|
| MENTAL ABUSE | DUDE, DIE, FOOL, DUMB, CRAP, IDIOT, ... | APPLE, ... | SCUM, ... |

FIG.7

| CATEGORY | RELEVANT KWs | EXTRACTION COUNT | INITIAL SETTING |
|---|---|---|---|
| MENTAL ABUSE | DUDE | 20 | |
| | DIE | 35 | YES |
| | FOOL | 9 | YES |
| | DUMB | 2 | |
| | CRAP | 16 | YES |

⬇ DELETION

| CATEGORY | RELEVANT KWs | EXCLUDED KWs | IMPERMISSIBLE KWs |
|---|---|---|---|
| MENTAL ABUSE | DUDE, DIE, FOOL, ~~DUMB~~, CRAP, IDIOT, ... | APPLE, ... | SCUM, ... |

FIG.12

| DEGREE OF RISK | DETERMINATION CRITERION |
|---|---|
| DEGREE OF RISK 5 | POINT RATE OF RECENT ONE WEEK (DETERMINATION WEEK) IS EQUAL TO OR GREATER THAN 1.5 |
| | POINT RATE OVER PAST FOUR WEEKS IS EQUAL TO OR GREATER THAN 1.4 |
| DEGREE OF RISK 4 | TOTAL POINT RATE OF PAST FOUR WEEKS IS EQUAL TO OR GREATER THAN 4.2 |
| | TOTAL POINT RATE OF PAST FOUR WEEKS IS EQUAL TO OR GREATER THAN 3.6, AND NUMBER OF CATEGORIES IS EQUAL TO OR GREATER THAN 2 |
| | POINT RATE OF RECENT ONE WEEK (DETERMINATION WEEK) IS EQUAL TO OR GREATER THAN 1.0 |
| | POINT RATE OVER PAST FOUR WEEKS IS EQUAL TO OR GREATER THAN 0.8 |
| DEGREE OF RISK 3 | TOTAL POINT RATE OF PAST FOUR WEEKS IS EQUAL TO OR GREATER THAN 2.4 |
| | TOTAL POINT RATE OF PAST FOUR WEEKS IS EQUAL TO OR GREATER THAN 1.8, AND NUMBER OF CATEGORIES IS EQUAL TO OR GREATER THAN 2 |
| | POINT RATE OF RECENT ONE WEEK (DETERMINATION WEEK) IS EQUAL TO OR GREATER THAN 0.5 |
| DEGREE OF RISK 2 | TOTAL POINT RATE OF PAST FOUR WEEKS IS EQUAL TO OR GREATER THAN 1.2 |
| | POINT RATE OF RECENT ONE WEEK (DETERMINATION WEEK) IS EQUAL TO OR GREATER THAN 0.3 |
| DEGREE OF RISK 1 | POINT RATE OF RECENT ONE WEEK (DETERMINATION WEEK) IS GREATER THAN 0.0 |
| | TOTAL POINT RATE OF PAST FOUR WEEKS IS EQUAL TO OR GREATER THAN 0.1 |

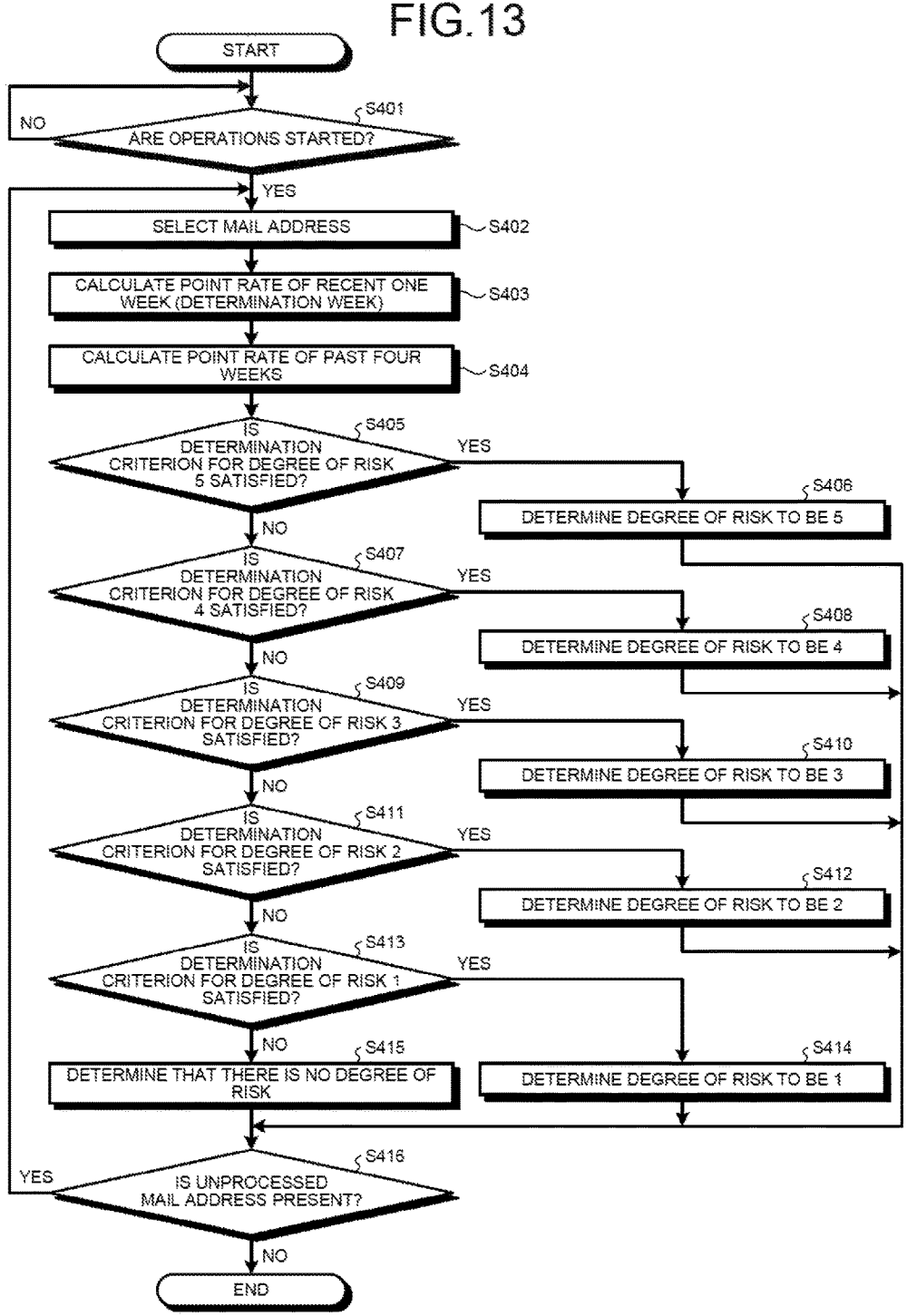

COMPUTER-READABLE RECORDING MEDIUM, DISPLAY CONTROL METHOD, AND INFORMATION PROCESSING DEVICE

CROSS-REFERENCE TO RELATED APPLICATION

This application is based upon and claims the benefit of priority of the prior Japanese Patent Application No. 2015-238086, filed on Dec. 4, 2015, the entire contents of which are incorporated herein by reference.

FIELD

The embodiments discussed herein are related to a computer-readable recording medium, a display control method, and an information processing device.

BACKGROUND

As a result of the penetration of the information technology (IT) environment including the Internet, a variety of information is getting distributed in the society. Moreover, there is a growing distribution of information using the IT in all types of scenarios such as in business or in individual interest or taste. The information that is distributed has a high degree of freedom and varies in the format and contents.

There is some information which if leaked may cause problems; or there is some information which generates a harmful effect, such as an attack or nastiness, to the persons to which the information is distributed. Thus, there is information posing various risks. Such information is constantly getting distributed in invisible form via the IT. Moreover, there is a possibility that a controversial action is unknowingly taken, and in some cases such an action leads to a bigger problem or a crime without someone realizing. Furthermore, information once let out in the society is difficult to take back. In this way, the distribution of information may cause a loss in the reliability of individuals and business enterprises.

In a business enterprise, electronic mails (hereinafter, sometimes written as mails) represent an example of the technology used for distributing information. In recent years, keywords affecting other people or keywords having a high frequency of appearance are registered in advance, and electronic mails including such keywords are extracted.

Patent Literature 1: Japanese Laid-open Patent Publication No. 2005-284454
Patent Literature 2: Japanese Laid-open Patent Publication No. 2007-249584
Patent Literature 3: Japanese Laid-open Patent Publication No. 2000-132553

SUMMARY

According to an aspect of an embodiment, a non-transitory computer-readable recording medium stores therein a display control program that causes a computer to execute a process. The process includes displaying a list of mail addresses of sources of mails matching with an extraction condition for inappropriate mails, the list being classified into levels which are divided according to transmission status of mails matching with the extraction condition for each mail address; and displaying, in response to selection of one of mail addresses from the list, transition of transmission status of mails which match with the extraction condition and have the selected mail address.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of the information stored in a category database (DB);
FIG. 6 is a diagram for explaining an example of automatic addition of keywords;
FIG. 7 is a diagram for explaining an example of automatic deletion of keywords;
FIG. 12 is a diagram for explaining a standard example of risk degree determination;
FIG. 13 is a flowchart for explaining a flow of a risk degree determination operation.

DESCRIPTION OF EMBODIMENTS

Preferred embodiments of the present invention will be explained with reference to accompanying drawings. However, the invention is not limited by the embodiments explained below. Moreover, the embodiments can be appropriately combined without causing any contradictions.

However, in the technology mentioned above, since it is difficult to manage the extraction status for each user, it is not possible to take appropriate measures thereby leading to an increase in compliance violation.

For example, just by updating the extraction condition, it is not possible to understand which user is violating the compliance in what manner or it is not possible to understand how many employees are being subjected to power harassment. For that reason, it is not possible to clamp down on the violator, thereby leading to an increase in compliance violation.

[a] First Embodiment

Overall Configuration

Figure 1:
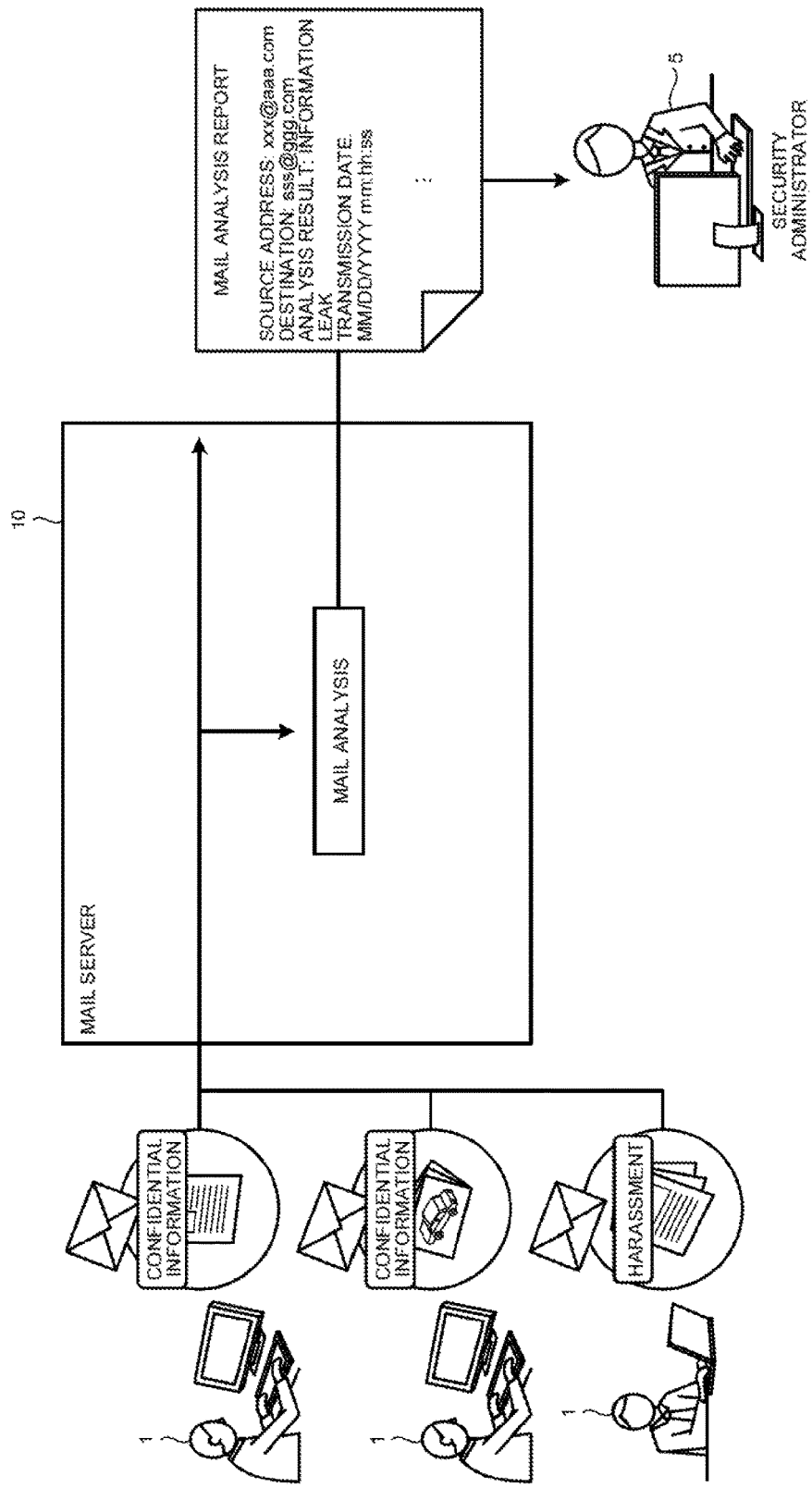
FIG. 1 is a diagram illustrating an exemplary overall configuration of a system according to a first embodiment.

FIG. 1 is a diagram illustrating an exemplary overall configuration of a system according to a first embodiment. As illustrated in FIG. 1, this system is an in-house electronic mail system in which electronic mails sent by employees 1 of a company are analyzed using a mail server 10 and a notification is sent to a security administrator 5 (hereinafter, sometimes written as administrator).

Each employee 1 accesses the mail server 10 using an electronic device such as a cellular phone or a personal computer, and communicates electronic mails with the other employees of the company and with people outside of the company. The administrator 5 uses the mail server 10, analyzes the electronic mails sent and received by the employees 1, and generates a mail analysis report.

The mail server 10 is a server device that provides various operations related to electronic mails, such as creation, transmission, and reception of electronic mails, to the employees 1. Moreover, the mail server 10 extracts, from among the target electronic mails for transmission that are sent by the employees 1, such electronic mails which generate a harmful effect, such as an attack or nastiness, to the addressed person.

For example, the mail server 10 determines whether or not a target electronic mail for transmission can be classified in one of the following categories: information leak, mental abuse, power harassment, and sexual harassment. Regarding an electronic mail that can be classified in one of the categories, the mail server 10 determines that the electronic mail is a problematic electronic mail and holds back from transmitting the electronic mail, and issues a warning to the person who created that electronic mail. On the other hand, regarding an electronic mail that is not classified in any of the categories, the mail server 10 determines that the electronic mail is a problem-free electronic mail and sends it to the destination.

Moreover, the mail server 10 analyzes the transmission status of electronic mails regarding each mail address, and generates an analysis result. For example, for each mail address, the mail server 10 counts the number of sent electronic mails that are classified in one of the categories of information leak, mental abuse, power harassment, and sexual harassment. Then, the mail server 10 displays the result of counting on a display unit such as a display, and outputs the result of counting in the form of a report.

Meanwhile, in the first embodiment, although the examples of categories include information leak, mental abuse, power harassment, and sexual harassment; those is not the only possible categories, and it is possible to arbitrarily add or modify the categories. Moreover, in the first embodiment, although the explanation is given for a case in which the outgoing mails are taken into account, that is not the only possible case. Alternatively, the incoming mails can be taken into account, or the outgoing mails as well as the incoming mails can be taken into account.

Device Configuration

Figure 2:
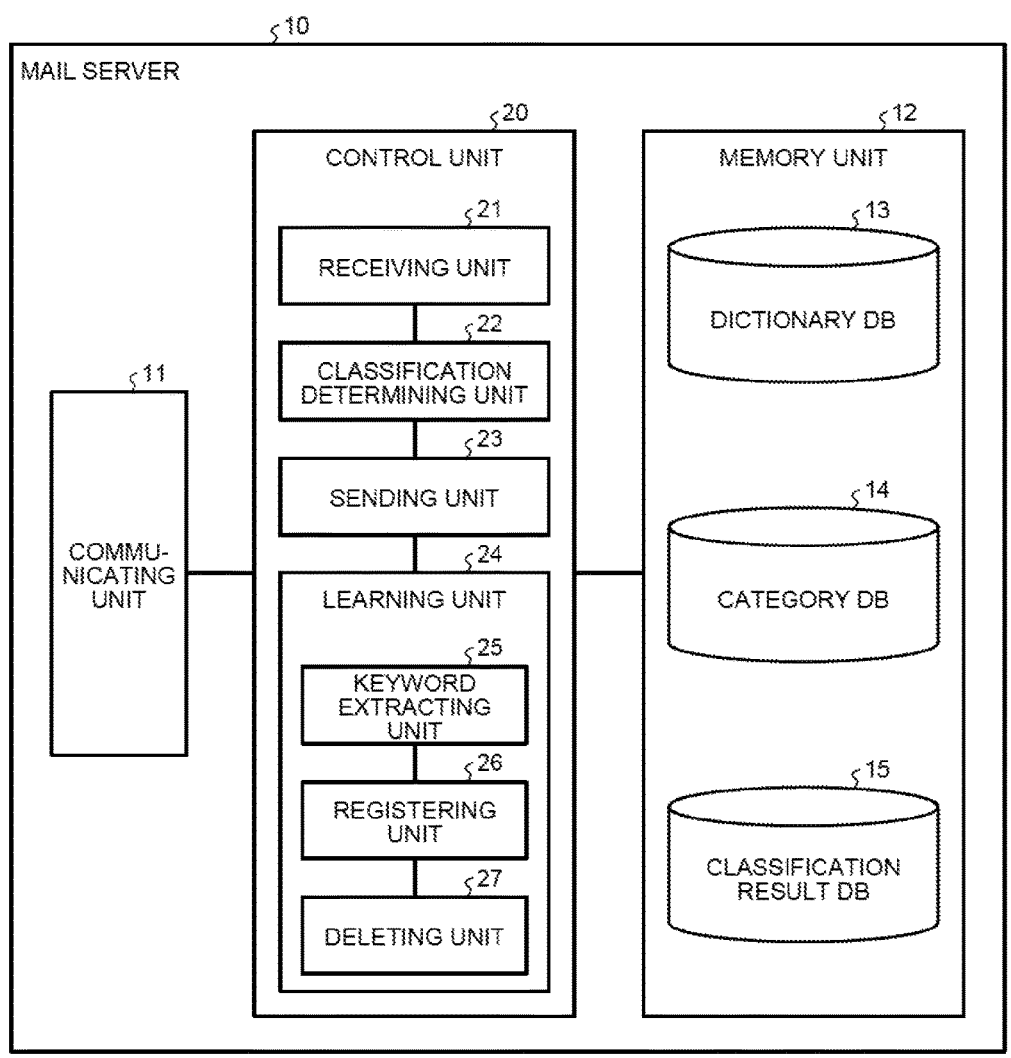
FIG. 2 is a functional block diagram illustrating a functional configuration of a mail server according to the first embodiment.

FIG. 2 is a functional block diagram illustrating a functional configuration of the mail server 10 according to the first embodiment. As illustrated in FIG. 2, the mail server 10 includes a communicating unit 11, a memory unit 12, and a control unit 20.

The communicating unit 11 is a processing unit that controls the communication with other devices. For example, the communicating unit 11 receives the target electronic mails for transmission from the electronic devices used by the employees 1. Moreover, the communicating unit 11 sends the target electronic mails for transmission to the respective destinations. Furthermore, the communicating unit 11 receives an instruction for analysis result from an administrator terminal used by the administrator 5, and sends the analysis result to the administrator terminal.

The memory unit 12 is a memory device used in storing the computer programs executed by the control unit 20 and storing the data used in various operations performed by the control unit 20. The memory unit 12 is a memory or a hard disk, for example. Herein, the memory unit 12 is used to store a dictionary database (DB) 13, a category DB 14, and a classification result DB 15.

The dictionary DB 13 is a database that, in the case of classifying electronic mails, is used to store information related to the words extracted from the contents of the electronic mails. For example, the dictionary DB 13 is used to store the following: words of each part of speech; a classification dictionary to be used in morphological analysis; and commonly-used coined terms.

The category DB 14 is a database for storing information related to the categories in which the electronic mails are classified. FIG. 3 is a diagram illustrating an example of the information stored in the category DB 14. As illustrated in FIG. 3, the category DB 14 is used to store the following items in a corresponding manner: category, relevant KWs, excluded KWs, and impermissible KWs.

The item "category" that is stored represents information enabling identification of the category for classification. The item "relevant KWs" represents the keywords (hereinafter, sometimes written as KWs) such as words that are determined to belong to the corresponding category, and are determined to have a relatively high frequency of usage in the corresponding category. The item "excluded KWs" represents the keywords having a high frequency of usage in the corresponding category, but also represents the keywords having a high frequency of usage in normal mails that do not belong to any category. The item "impermissible KWs" represents the keywords that define the corresponding category, and a mail including any impermissible keyword is determined to be the relevant mails regardless of the presence of other keywords. Herein, the items "relevant KWs" and "excluded KWs" are targets for a learning operation (described later), while the item "impermissible KWs" is set by the administrator 5.

In the example illustrated in FIG. 3, an electronic mail including keywords such as "client company" and "secret" is likely to be used as an electronic mail falling under "information leak"; while an electronic mail including keywords such as "trade secret" is classified in the category "information leak". On the other hand, an electronic mail including keywords such as "estimate" is likely to be used as an electronic mail falling under "information leak" but is determined to be a normal mail.

Meanwhile, the keywords can be managed by associating each keyword with information indicating whether the keyword is manually set by the administrator 5 or is learnt during a learning operation (described later). For example, in the category DB 14, each keyword can be stored in a corresponding manner to "initial setting". For example, a keyword set by the administrator 5 has "Yes" set in "initial setting".

The classification result DB 15 is a database for storing the classification result of the target electronic mails for transmission and for category determination. For example, the classification result DB 15 is used to store the electronic mails and the classification results in a corresponding manner. Alternatively, the classification result DB 15 can be used to store the classification result for each source mail address or for each destination mail address, or can be used to store the classification result for each pair of a source mail address and a destination mail address.

The control unit 20 is a processing unit that controls the overall operations of the mail server 10 and is a processor, for example. The control unit 20 includes a receiving unit 21, a classification determining unit 22, a sending unit 23, and a learning unit 24. Herein, the receiving unit 21, the classification determining unit 22, the sending unit 23, and the learning unit 24 represent examples of electronic circuits of the processor or represent examples of processes executed by the processor.

The receiving unit 21 is a processing unit that receives electronic mails. More particularly, the receiving unit 21 receives the target electronic mails for transmission that are to be sent to the destinations from the electronic devices used by the employees 1, and outputs the electronic mails to the classification determining unit 22.

The classification determining unit 22 is a processing unit that classifies an electronic mail, which is received by the receiving unit 21, according to the information stored in the category DB 14. More particularly, the classification determining unit 22 determines whether the electronic mail is classified in any one of the categories of information leak, mental abuse, power harassment, sexual harassment, and normal mail; and stores the determination result in the classification result DB 15.

Meanwhile, the classification determining unit 22 can implement various classification methods used in keyword classification or category classification. Given below is an example of the classification method. For example, the classification determining unit 22 extracts the text written in the subject and the text written in the main body, and extracts words by referring to the dictionary DB 13 and performing morphological analysis. Then, the classification determining unit 22 classifies the electronic mail depending on which extracted word corresponds to which type of keywords. When the extracted words are not classified in any category, the classification determining unit 22 classifies the received electronic mail as a normal mail, and stores a copy of the normal mail along with the classification result in the classification result DB 15.

For example, if the extracted words include "trade secret", then the classification determining unit 22 classifies the concerned electronic mail in the category "information leak" regardless of the status of the other words. In an identical manner, if the extracted words include "goldbricker", then the classification determining unit 22 classifies the concerned electronic mail in the category "power harassment" regardless of the status of the other words.

Meanwhile, consider a case in which there are three words belonging to the item "relevant KWs" of the category "information leak", 10 words belonging to the item "relevant KWs" of the category "mental abuse", two words belonging to the item "relevant KWs" of the category "power harassment", and four words belonging to the item "relevant KWs" of the category "sexual harassment". In that case, the classification determining unit 22 selects the category "mental abuse" having the most number of words and classifies the concerned electronic mail in the category "mental abuse".

Alternatively, consider a case in which there are three words belonging to the item "relevant KWs" of the category "information leak", 10 words belonging to the item "relevant KWs" of the category "mental abuse", two words belonging to the item "relevant KWs" of the category "power harassment", and seven words belonging to the item "relevant KWs" of the category "sexual harassment". In that case, the classification determining unit 22 selects the categories "mental abuse" and "sexual harassment" having the number of words equal to or greater than a threshold value (for example, five) and classifies the concerned electronic mail in the categories "mental abuse" and "sexual harassment".

If a plurality of categories equal to or greater than a threshold value is extracted, then the classification determining unit 22 can also use the number of excluded keywords that are extracted. For example, in the case in which there are three words belonging to the item "relevant KWs" of the category "information leak", 10 words belonging to the item "relevant KWs" of the category "mental abuse, two words belonging to the item "relevant KWs" of the category "power harassment, and seven words belonging to the item "relevant KWs" of the category "sexual harassment; the classification determining unit 22 selects the categories "mental abuse" and "sexual harassment" having the number of words equal to or greater than a threshold value (for example, five).

Subsequently, the classification determining unit 22 identifies that three excluded keywords of the category "mental abuse" are extracted and that zero excluded keywords of the category "sexual harassment" are extracted. Although the concerned electronic mail has a lot of words corresponding to the category "mental abuse", many of the same words are also used in normal mails. Hence, the classification determining unit 22 classifies the concerned electronic mail in the category "sexual harassment" having fewer excluded keywords.

Alternatively, the classification determining unit 22 can perform classification using the extraction percentage of the relevant keywords and the excluded keywords. For example, from among all extracted words, the classification determining unit 22 can identify the category having the percentage of the relevant keywords to be equal to or greater than a predetermined value (a threshold value A) and having the percentage of the excluded keywords to be equal to or smaller than a predetermined value (a threshold value B); and can accordingly classify the concerned electronic mail.

The sending unit 23 is a processing unit that sends a received electronic mail to the destination. For example, regarding an electronic mail that has been determined to be a normal mail, the sending unit 23 sends that electronic mail to the destination. Moreover, regarding a risky electronic mail that is classified in one of the categories specified in the category DB 14; for example, the sending unit 23 sends a warning to the sender and sends the electronic mail to the destination along with a message such as "please consult with the administrator".

The learning unit 24 is a processing unit that includes a keyword extracting unit 25, a registering unit 26, and a deleting unit 27; and that makes use of the constituent elements and learns the various types of keywords stored in the category DB 14. The learning operation can be performed on a periodic basis or at arbitrary timings. Herein, the learning unit 24 performs the learning operation with respect to the electronic mails stored in the classification result DB 15, that is, with respect to the electronic mails classified in any one of the categories.

The keyword extracting unit 25 is a processing unit that extracts keywords from an already-classified electronic mail. More particularly, the keyword extracting unit 25 reads an already-classified electronic mail and the corresponding category from the classification result DB 15, and extracts keywords from the subject and the body text of that electronic mail according to a known method such as co-occurrence probability or clustering.

Figure 4:
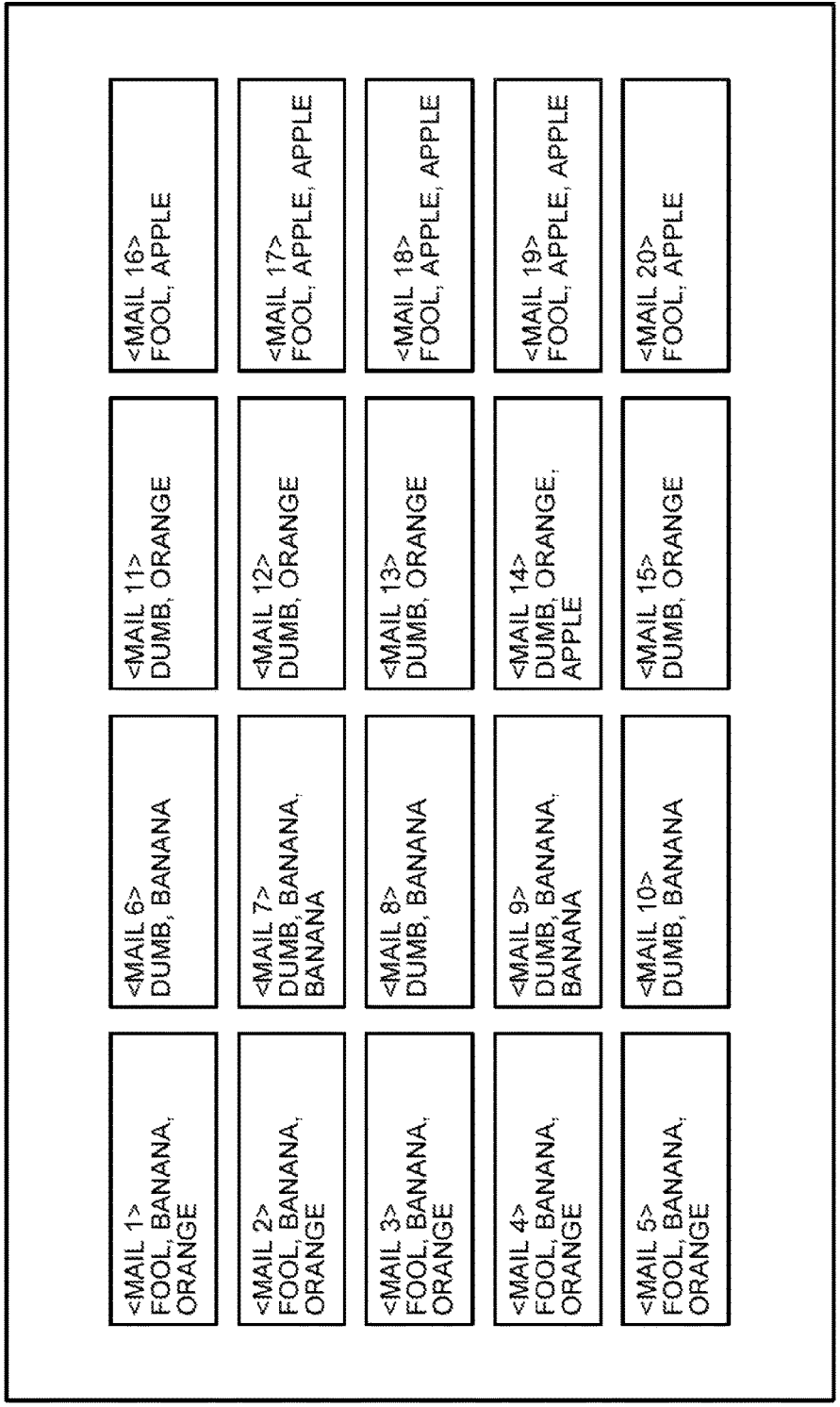
FIG. 4 is a diagram for explaining an example of extracting classified keywords according to co-occurrence probability.

Given below is the explanation of a specific example of keyword extraction. FIG. 4 is a diagram for explaining an example of extracting classified keywords according to co-occurrence probability. As illustrated in FIG. 4, the explanation is given with reference to 20 electronic mails from a mail 1 to a mail 20 that are classified in the category "mental abuse". As illustrated in FIG. 4, the keyword extracting unit 25 refers to the dictionary DB 13 and extracts keywords from the 20 electronic mails. Herein, from the 20 electronic mails, the keyword extracting unit 25 excludes such keywords which are already registered in the item "relevant KWs" of the category "mental abuse"; and considers "banana", "orange", and "apple" as candidates for registration.

In the example illustrated in FIG. 4, since 10 electronic mails out of the 20 electronic mails include "banana", the keyword extracting unit 25 calculates the probability of occurrence as "10/20×100=50%". Similarly, since nine electronic mails out of the 20 electronic mails include "orange", the keyword extracting unit 25 calculates the probability of occurrence as "9/20×100=45%". Moreover, since seven electronic mails out of the 20 electronic mails include "apple", the keyword extracting unit 25 calculates the probability of occurrence as "7/20×100=35%".

As a result, the keyword extracting unit 25 extracts "banana", which has the probability of occurrence equal to or greater than a threshold value (50%), as the target keyword for registration.

Figure 5:
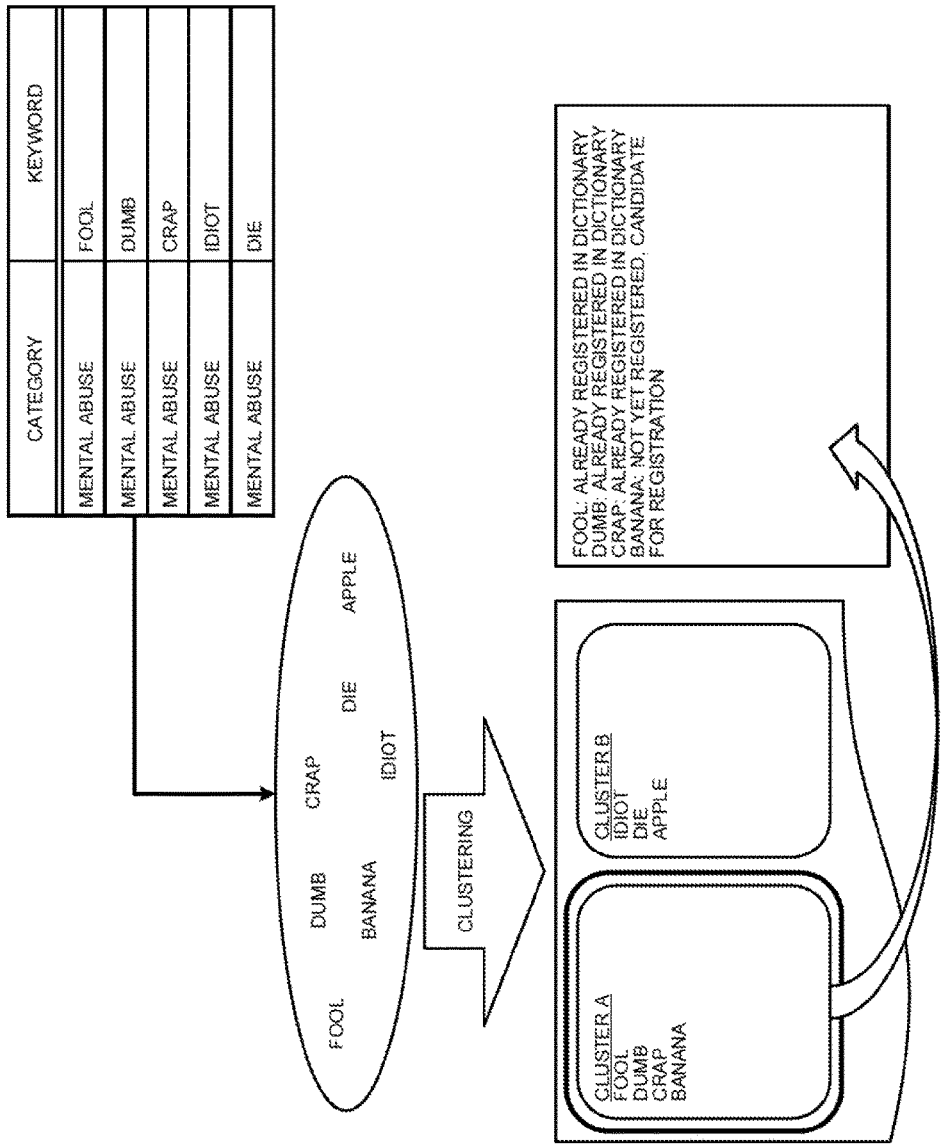
FIG. 5 is a diagram for explaining an example of extracting classified keywords according to clustering.

Given below is the explanation of an example of extracting classified keywords according to clustering. FIG. 5 is a diagram for explaining an example of extracting classified keywords according to clustering. As illustrated in FIG. 5, the category "mental abuse" has "fool", "dumb", "crap", "idiot", and "die" registered as the keywords. In that state, the keyword extracting unit 25 refers to the dictionary DB 13 and extracts "fool", "dumb", "crap", "banana", "idiot", "die", and "apple" from all electronic mails classified in the category "mental abuse".

Then, with respect to the extracted keywords "fool", "dumb", "crap", "banana", "idiot", "die", and "apple"; the keyword extracting unit 25 performs clustering using a learning algorithm that enables learning according to synonyms or syntactic dependency. Then, the keyword extracting unit 25 classifies "fool", "dumb", "crap" and "banana" in a cluster A; and classifies "idiot", "die", and "apple" in a cluster B.

As a result, the keyword extracting unit 25 selects the partial set having the least number of keywords not appearing in the electronic mail, that is, selects the cluster A having the greater number of classified keywords. Then, from among "fool", "dumb", "crap", and "banana" clustered in the cluster A; the keyword extracting unit 25 extracts the not-yet-registered "banana" as the target keyword for registration.

Meanwhile, the keyword extracting unit 25 can either perform an extraction operation according to co-occurrence probability, or perform an extraction operation according to clustering, or perform an extraction operation according to both co-occurrence probability and clustering. For example, the keyword extracting unit 25 can determine the keywords extracted according to either co-occurrence probability or clustering as the target keywords for registration, or can determine the keywords extracted according to co-occurrence probability as well as clustering as the target keywords for registration.

The registering unit 26 is a processing unit that registers new keywords in the category DB 14. More particularly, the registering unit 26 obtains, from the keyword extracting unit 25, the category for registration and the keywords to be registered, and registers the keywords in the item "relevant KWs" of the concerned category. For example, if the category "mental abuse" and the keyword "banana" is obtained from the keyword extracting unit 25, then the registering unit 26 registers the keyword "banana" in the item "relevant KWs" of the category "mental abuse" in the category DB 14. At that time, if the keyword "banana" falls under the existing excluded keywords of the category "mental abuse", then the registering unit 26 holds back from registering that keyword.

FIG. 6 is a diagram for explaining an example of automatic addition of keywords. As illustrated in FIG. 6, the keyword extracting unit 25 extracts "die" and "dude" as the keywords from an electronic mail inflicting mental abuse. Since the keyword "die" is already registered, the registering unit 26 registers the not-yet-registered keyword "dude" in the item "relevant KWs" of the category "mental abuse".

Meanwhile, the registering unit 26 can also extract excluded keywords and newly register them. For example, the registering unit 26 reads such electronic mails from the classification result DB 15 which are classified as normal mails, and extracts keywords from each electronic mail. Then, the registering unit 26 identifies the keywords included in a threshold percentage (for example, 70%) of the normal mails, and registers the keywords in the item "excluded KWs" of each category in the category DB 14.

Regarding the target keywords for registration that are extracted by the keyword extracting unit 25, the registering unit 26 can determine whether or not each keyword falls under the excluded keywords and, if the keyword falls under the excluded keywords, can register the keyword in the item "excluded KWs". In the example explained above, the registering unit 26 determines the percentage of normal mails that include the target keyword "banana" for registration as obtained from the keyword extracting unit 25. If the percentage of including the target keyword "banana" for registration is smaller than a threshold value (for example, 50%), then the registering unit 26 registers the keyword "banana" in the item "relevant KWs" of the category "mental abuse" in the category DB 14. On the other hand, if the percentage is equal to or greater than the threshold value, then the registering unit 26 registers the keyword "banana" in the item "excluded KWs" of the category "mental abuse" in the category DB 14.

The deleting unit 27 is a processing unit that, from among the relevant keywords stored in the category DB 14, deletes the keywords having a low frequency of usage. More particularly, every time the abovementioned learning operation is performed, the deleting unit 27 counts the number of appearances of each keyword registered in the item "relevant KWs" of each category. Then, the deleting unit 27 deletes such keywords from the item "relevant KWs" which match with a pre-specified deletion condition such as the keywords having the number of appearances to be continuously smaller than a threshold value for a predetermined number of times or the keywords having the number of appearances to be smaller than a threshold value.

Moreover, when the target relevant keyword for deletion is a keyword having the initial setting done by the administrator, the deleting unit 27 holds back from deleting that keyword. When the target relevant keyword for deletion has been learnt in the past during a learning operation, the deleting unit 27 deletes the keyword. Regarding the excluded keywords too, the deleting unit 27 can delete the keywords having a low frequency of usage in the normal mails in an identical manner.

FIG. 7 is a diagram for explaining an example of automatic deletion of keywords. As illustrated in FIG. 7, in the item "relevant KWs" of the category "mental abuse", the keyword "dude" has the extraction count of 20, the keyword "die" has the extraction count of 35, the keyword "fool" has the extraction count of 9, the keyword "dumb" has the extraction count of 2, and the keyword "crap" has the extraction count of 16. In this case, the deleting unit 27 determines the keywords "fool" and "dumb" having the extraction count to be smaller than a threshold value (10) as the target keywords for deletion. However, since the keyword "fool" has "yes" set in the initial setting, it is excluded from the targets for deletion. As a result, the deleting unit 27 deletes only the keyword "dumb" from the item "relevant KWs" of the category "mental abuse".

Flow of Operations

Given below is the explanation of a flow of various operations performed in the mail server 10. Herein, the explanation is given about a classification operation, an addition operation, and a deletion operation.

Flow of Classification Operation

Figure 8:
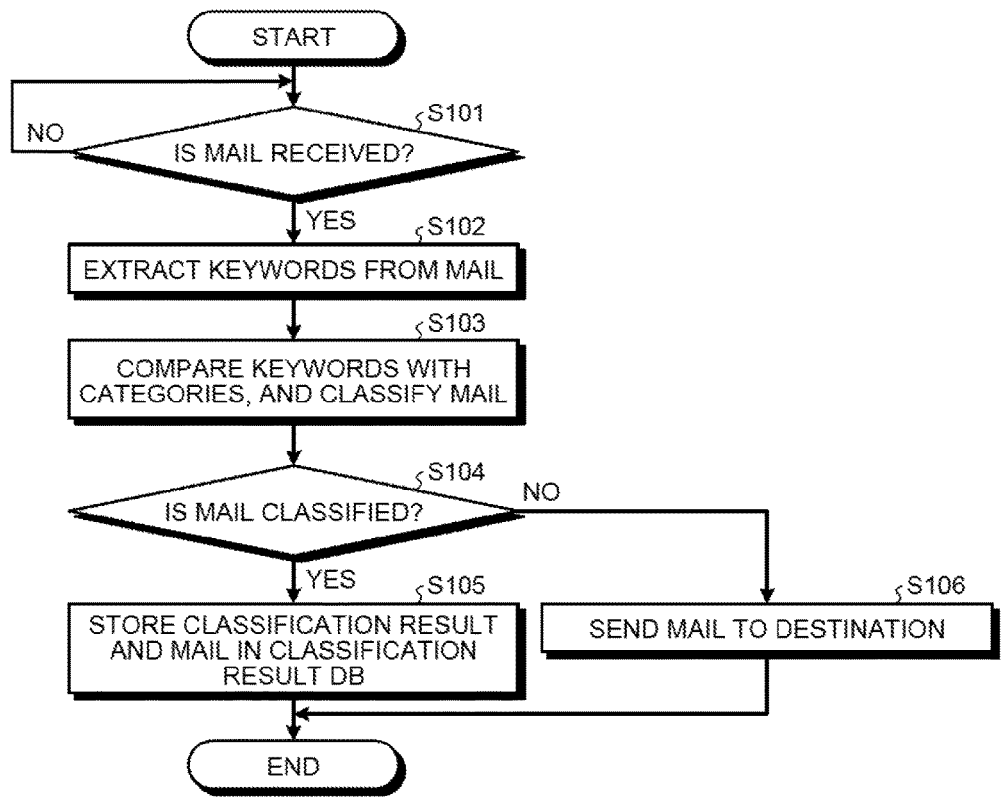
FIG. 8 is a flowchart for explaining a flow of operations performed during a mail classification operation.

FIG. 8 is a flowchart for explaining a flow of operations performed during a mail classification operation. As illustrated in FIG. 8, when an electronic mail is received by the receiving unit 21 (Yes at S101), the classification determining unit 22 refers to the dictionary DB 13 and extracts keywords from the electronic mail (S102).

Then, the classification determining unit 22 compares the extracted keywords with the category-related information stored in the category DB 14, and classifies the electronic mail (S103). Once the electronic mail is classified (Yes at S104), the classification determining unit 22 stores the electronic mail and the classification result in the classification result DB 15 (S105).

On the other hand, when the electronic mail is not classified by the classification determining unit 22 (No at S104), the sending unit 23 determines the electronic mail to be a normal mail and sends it to the destination (S106). However, regarding a normal mail too, the classification determining unit 22 stores a copy of the electronic mail and the classification result in the classification result DB 15.

Flow of Addition Operation

Figure 9:
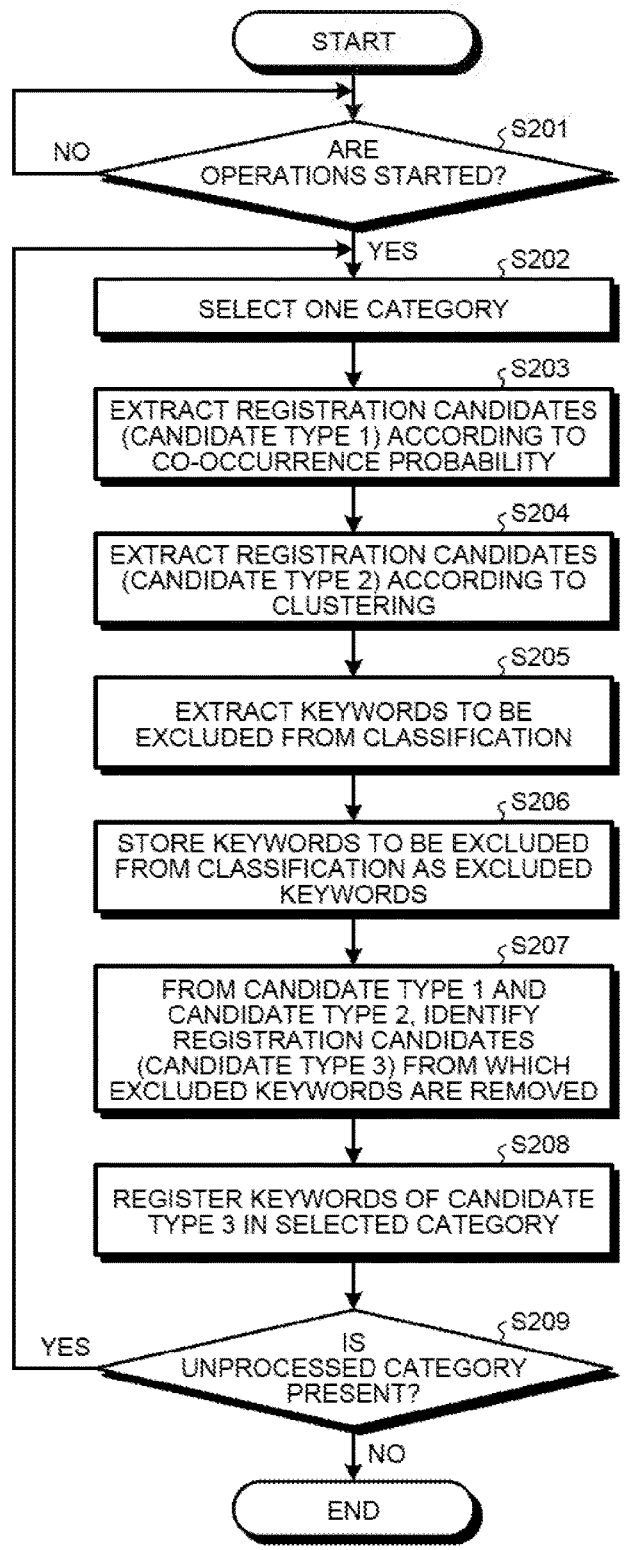
FIG. 9 is a flowchart for explaining a flow of a keyword addition operation.

FIG. 9 is a flowchart for explaining a flow of a keyword addition operation. As illustrated in FIG. 9, at the operation start timing (Yes at S201), the keyword extracting unit 25 selects a single category (S202); obtains the electronic mails classified in the selected category from among the electronic mails stored in the classification result DB 15; and extracts registration candidates (candidate type 1) according to co-occurrence probability (S203).

Then, the keyword extracting unit 25 extracts registration candidates (candidate type 2) according to clustering from the electronic mails classified in the selected category (S204). Subsequently, using the normal mails, the registering unit 26 extracts the keywords to be excluded from the classification targets, that is, extracts the keywords to be excluded from the registration targets (S205).

Then, the registering unit 26 stores the keywords to be excluded from the classification targets as excluded keywords (S206). Moreover, from the candidate type 1 and the candidate type 2, the registering unit 26 identifies registration candidates (candidate type 3) from which excluded keywords are removed (S207).

Subsequently, the registering unit 26 registers the keywords of the candidate type 3 in the item "relevant KWs" of the selected category (S208). Then, if any unprocessed category is present (Yes at S209), the operations from S202 onward are performed again. When no unprocessed category is present (No at S209), it marks the end of the addition operation.

Flow of Deletion Operation

Figure 10:
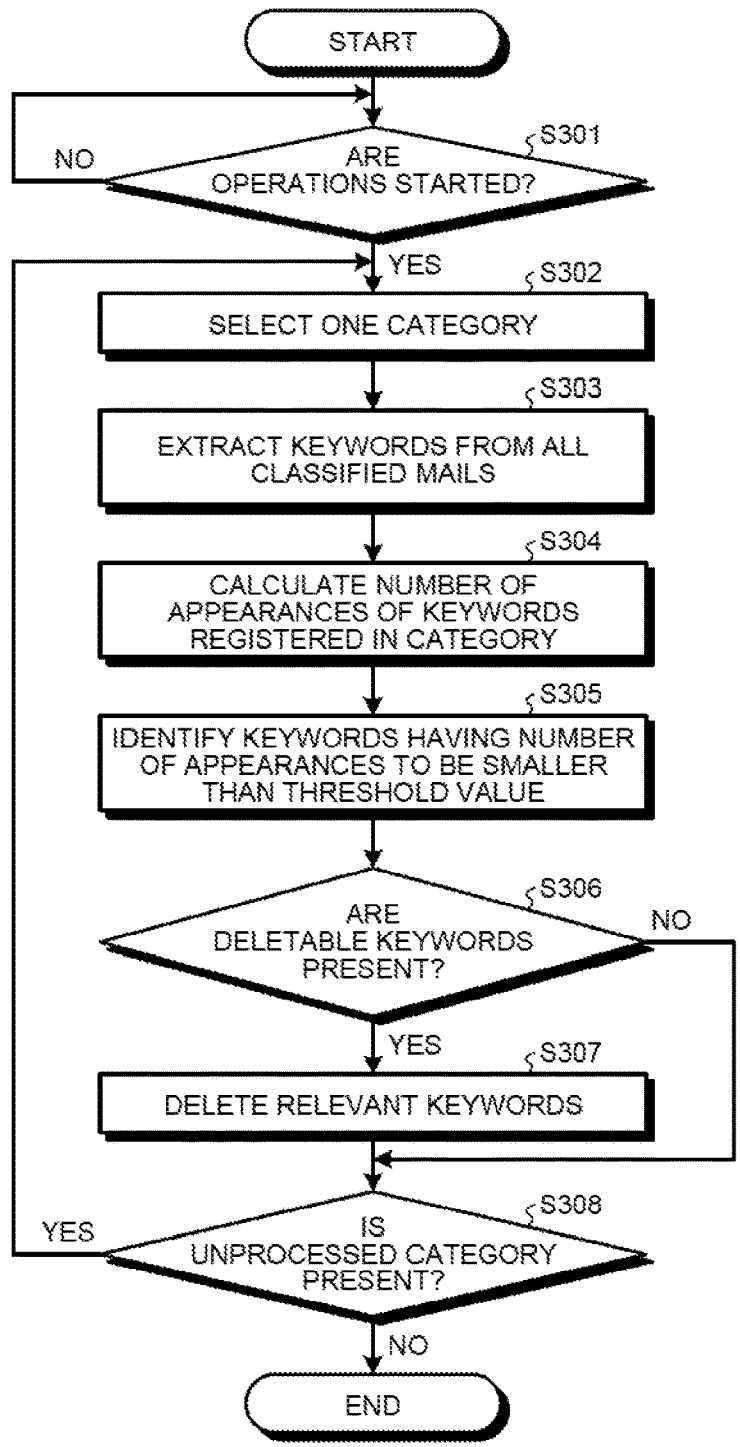
FIG. 10 is a flowchart for explaining a flow of a keyword deletion operation.

FIG. 10 is a flowchart for explaining a flow of a keyword deletion operation. As illustrated in FIG. 10, at the operation start timing (Yes at S301), the deleting unit 27 selects a single category (S302) and extracts keywords from the electronic mails that are classified in the selected category from among the electronic mails stored in the classification result DB 15 (S303).

Then, using the keywords extracted from the concerned electronic mails, the deleting unit 27 calculates the number of appearances of the keywords registered in "category" in the category DB 14 (S304). Subsequently, the deleting unit 27 identifies the keywords having the number of appearances to be smaller than a threshold value (S305).

Subsequently, when the identified keywords having the number of appearances to be smaller than a threshold value include deletable keywords (Yes at S306), the deleting unit deletes those keywords from the item "relevant KWs" in the category DB 14 (S307). That is, from among the identified keywords having the number of appearances to be smaller than a threshold value, the deleting unit 27 deletes the keywords not having the initial setting.

On the other hand, when deletable keywords are not present (No at S306); the system control proceeds to S308. Subsequently, when any unprocessed category is present (Yes at S308), the operations from S302 onward are performed again. When no unprocessed category is present (No at S308), it marks the end of the deletion operation.

Effect

The mail server 10 according to the first embodiment can periodically learn the keywords used in each category, and thus can keep a daily track of the changes attributed to the changes of the times and the fashion. Thus, as a result of continuously using the same extraction condition, it is believed that the extraction count goes on decreasing. However, by periodically updating the extraction condition, it is possible to expect improvement in the extraction count. That enables maintaining the extraction accuracy of the electronic mails that violate the compliance and create an adverse effect.

Moreover, the mail server 10 can focus on the passage of time, capture the changes, and constantly vary the value (weight) of the keywords. Besides, the mail server 10 can maintain recency and optimality of the extraction condition, and accordingly update and delete the keywords.

Furthermore, the mail server 10 can obtain unique evaluation or peculiar evaluation that is not taken into account in commonly-used keywords, and can obtain the result in tune with the objective of the users. Moreover, the mail server 10 can perform learning suitable to the users and thus learn matching keywords for the users, thereby enabling achieving enhancement in the extraction accuracy.

[b] Second Embodiment

Overall Configuration

In addition to the operations explained in the first embodiment, the mail server 10 can analyze the mail transmission status of the employees 1. In that regard, in a second embodiment, the explanation is given for an example in which the mail server 10 analyzes the degree of risk of the electronic mails sent from each mail address. Herein, since the overall configuration is identical to the first embodiment, that explanation is not repeated.

Functional Configuration

Figure 11:
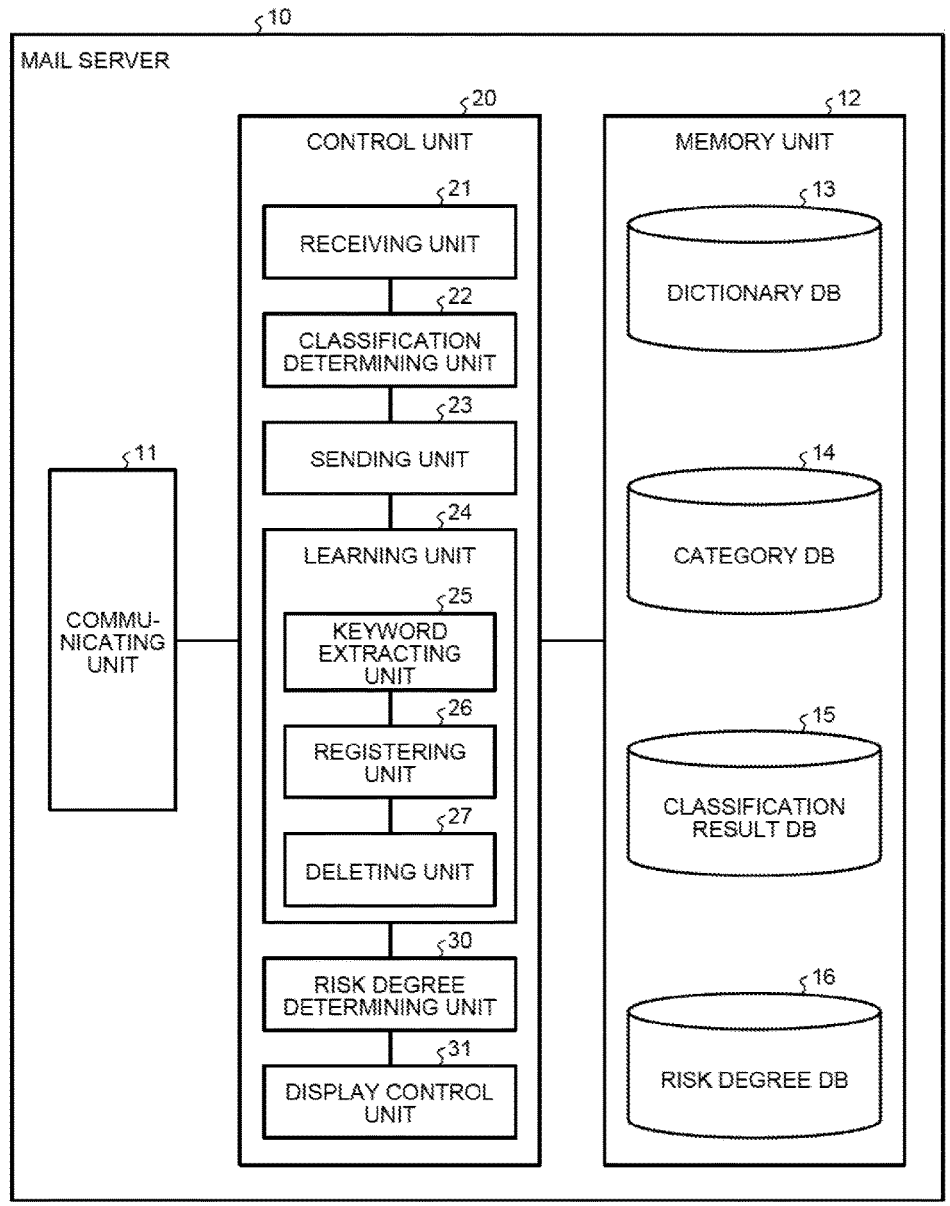
FIG. 11 is a functional block diagram illustrating a functional configuration of the mail server according to a second embodiment.

FIG. 11 is a functional block diagram illustrating a functional configuration of the mail server 10 according to the second embodiment. As illustrated in FIG. 11, the mail server 10 includes the communicating unit 11, the memory unit 12, and the control unit 20. However, the difference from the first embodiment is that a risk degree DB 16, a risk degree determining unit 30, and a display control unit 31 are included. Thus, in the second embodiment, the explanation is given about the risk degree DB 16, the risk degree determining unit 30, and the display control unit 31. Meanwhile, the memory unit 12 is used to store the target electronic mails for transmission, that is, to store all electronic mails received by the receiving unit 21.

The risk degree DB 16 is a database for storing the degree of risk determined with respect to each mail address. More particularly, the risk degree DB 16 is used to store the degree of risk, which is determined according to an operation described later, for each source mail address, for each destination mail address, and for each pair of a source mail address and a destination mail address. Thus, the risk degree DB 16 is used to store information enabling identification of the users who send electronic mails causing information leak, mental abuse, power harassment, or sexual harassment.

The risk degree determining unit 30 is a processing unit that determines the users who carry a high risk of sending vicious electronic mails. More particularly, for each source mail address, for each destination mail address, and for each pair of a source mail address and a destination mail address; the risk degree determining unit 30 determines the degree of risk according to a predetermined criterion and stores the determination result in the risk degree DB 16.

For example, the risk degree determining unit 30 assigns points according to the number of electronic mails classified in each category. As an example, if two electronic mails are classified in the category "information leak", the risk degree determining unit 30 assigns two points. Similarly, also when two electronic mails are classified in the categories "information leak" and "sexual harassment", the risk degree determining unit 30 assigns two points. Moreover, if the risk degree determination is performed on a Wednesday, then the risk degree determining unit 30 performs determination for the first week (1 week) during the three days of Monday, Tuesday, and Wednesday.

Meanwhile, the risk degree determining unit 30 performs determination not according to the number of points but according to the rate (points/days). For example, if two points are assigned over the three days of Monday, Tuesday, and Wednesday; then the risk degree determining unit 30 calculates "2/3=0.66660.67".

Given below is the explanation of a standard example of risk degree determination. FIG. 12 is a diagram for explaining a standard example of risk degree determination. As illustrated in FIG. 12, each degree of risk has determination criteria set therefor. Herein, the degree of risk 5 is assumed to be the highest. Although each degree of risk is set with a plurality of determination conditions, the conditions either can be OR conditions or can be AND conditions, and can be set in an arbitrary manner. Herein, the explanation is given for the case of OR conditions.

As illustrated in FIG. 12, the risk degree determining unit 30 determines that the mail addresses satisfying the following criterion have the degree of risk 5: "(the point rate in the determination week)≥1.5", or "(the point rate four weeks ago)≥1.4 and (the point rate three weeks ago)≥1.4 and (the point rate two weeks ago)≥1.4 and (the point rate one week ago)≥1.4".

Moreover, the risk degree determining unit 30 determines that the mail addresses satisfying the following criterion have the degree of risk 4: "(the point rate four weeks ago)+(the point rate three weeks ago)+(the point rate two weeks ago)+(the point rate one week ago)≥4.2". In an identical manner, the risk degree determining unit 30 determines that the mail addresses satisfying the following criterion have the degree of risk 4: "(the point rate four weeks ago)+(the point rate three weeks ago)+(the point rate two weeks ago)+(the point rate one week ago)≥3.6" and "classified into two or more categories over the four weeks". Moreover, the risk degree determining unit 30 determines that the mail addresses satisfying the following criterion have the degree of risk 4: "(the point rate in the determination week)≥1.0". Furthermore, the risk degree determining unit 30 determines that the mail addresses satisfying the following criterion have the degree of risk 4: "(the point rate four weeks ago)≥0.8 and (the point rate three weeks ago) ≥0.8 and (the point rate two weeks ago)≥0.8 and (the point rate one week ago)≥0.8".

The risk degree determining unit 30 determines that the mail addresses satisfying the following criterion have the degree of risk 3: "(the point rate four weeks ago)+(the point rate three weeks ago)+(the point rate two weeks ago)+(the point rate one week ago)≥2.4". In an identical manner, the risk degree determining unit 30 determines that the mail addresses satisfying the following criterion have the degree of risk 3: "(the point rate four weeks ago)+(the point rate three weeks ago)+(the point rate two weeks ago)+(the point rate one week ago)≥1.8" and "classified into two or more categories over the four weeks". Moreover, the risk degree determining unit 30 determines that the mail addresses satisfying the following criterion have the degree of risk 3: "(the point rate in the determination week)≥0.5".

The risk degree determining unit 30 determines that the mail addresses satisfying the following criterion have the degree of risk 2: "(the point rate four weeks ago)+(the point rate three weeks ago)+(the point rate two weeks ago)+(the point rate one week ago)≥1.2". In an identical manner, the risk degree determining unit 30 determines that the mail addresses satisfying the following criterion have the degree of risk 2: "(the point rate in the determination week)≥0.3".

The risk degree determining unit 30 determines that the mail addresses satisfying the following criterion have the degree of risk 1: "(the point rate four weeks ago)+(the point rate three weeks ago)+(the point rate two weeks ago)+(the point rate one week ago)≥0.1". In an identical manner, the risk degree determining unit 30 determines that the mail addresses satisfying the following criterion have the degree of risk 1: "(the point rate in the determination week)>0.0".

Regarding the mail addresses not satisfying any of the determination criteria given above, the risk degree determining unit 30 determines that the corresponding electronic mails have the degree of risk 0, that is, the corresponding electronic mails are normal mails.

The display control unit 31 is a processing unit that displays a variety of information, and performs display control according to the user operations performed by the administrator 5. More particularly, the display control unit 31 displays, on a display, or sends, to the administrator terminal, the following: the display of mail addresses at each degree of risk; the transition of the mail transmission status for each mail address; and the transition of mail classification before and after category learning.

Moreover, the display control unit 31 can obtain, from the learning unit 24, the learning result of the learning explained in the first embodiment and the result of various operations performed up to the learning; and can display the obtained information. For example, the display control unit 31 can count, for each mail address, the extraction count of each relevant keyword of each category and display the counting result. Meanwhile, regarding the counting result, the learning unit 24 can obtain the counting result, or the display control unit 31 can obtain perform counting from the various operation results in the learning operation.

Flow of Risk Degree Determination Operation

FIG. 13 is a flowchart for explaining a flow of a risk degree determination operation. As illustrated in FIG. 13, at the operation start timing (Yes at S401), the risk degree determining unit 30 selects one of the mail addresses stored in the classification result DB 15 (S402).

Then, regarding the selected mail address, the risk degree determining unit 30 refers to the classification result DB 15 and calculates the point rate of the recent one week (S403) and calculates the total point rate of the past four weeks (S404). At that time, the risk degree determining unit 30 also calculates the concerned category count in the determination week and the concerned category count over the past four weeks.

When the point rate and the category count satisfy the determination criterion for the degree of risk 5 (Yes at S405), the risk degree determining unit 30 determines that the selected mail address has the degree of risk 5 (S406), and the system control proceeds to S416.

However, when the point rate and the category count do not satisfy the determination criterion for the degree of risk 5 (No at S405) but satisfy the determination criterion for the degree of risk 4 (Yes at S407), the risk degree determining unit 30 determines that the selected mail address has the degree of risk 4 (S408), and the system control proceeds to S416.

When the point rate and the category count do not satisfy the determination criterion for the degree of risk (No at S407) but satisfy the determination criterion for the degree of risk 3 (Yes at S409), the risk degree determining unit 30 determines that the selected mail address has the degree of risk 3 (S410), and the system control proceeds to S416.

When the point rate and the category count do not satisfy the determination criterion for the degree of risk 3 (No at S409) but satisfy the determination criterion for the degree of risk 2 (Yes at S411), the risk degree determining unit 30 determines that the selected mail address has the degree of risk 2 (S412), and the system control proceeds to S416.

When the point rate and the category count do not satisfy the determination criterion for the degree of risk (No at S411) but satisfy the determination criterion for the degree of risk 1 (Yes at S413), the risk degree determining unit 30 determines that the selected mail address has the degree of risk 1 (S414), and the system control proceeds to S416.

When the point rate and the category count do not satisfy the determination criterion for the degree of risk (No at S413), the risk degree determining unit 30 determines that the selected mail address does not have any degree of risk (S415). Then, if any unselected mail address is present (Yes at S416), the risk degree determining unit 30 again performs the operations from S402 onward. When no unselected mail address is present (No at S416), it marks the end of the operations.

Specific Examples of Display Control

Explained below with reference to FIGS. 14 to 19 are display examples displayed by the display control unit 31. Meanwhile, the display control unit 31 can every time obtain the risk degree determination result from the risk degree determining unit 30 and the learning result from the learning unit 24, and store the results in the memory unit 12.

Mail Determination Result

Figure 14:
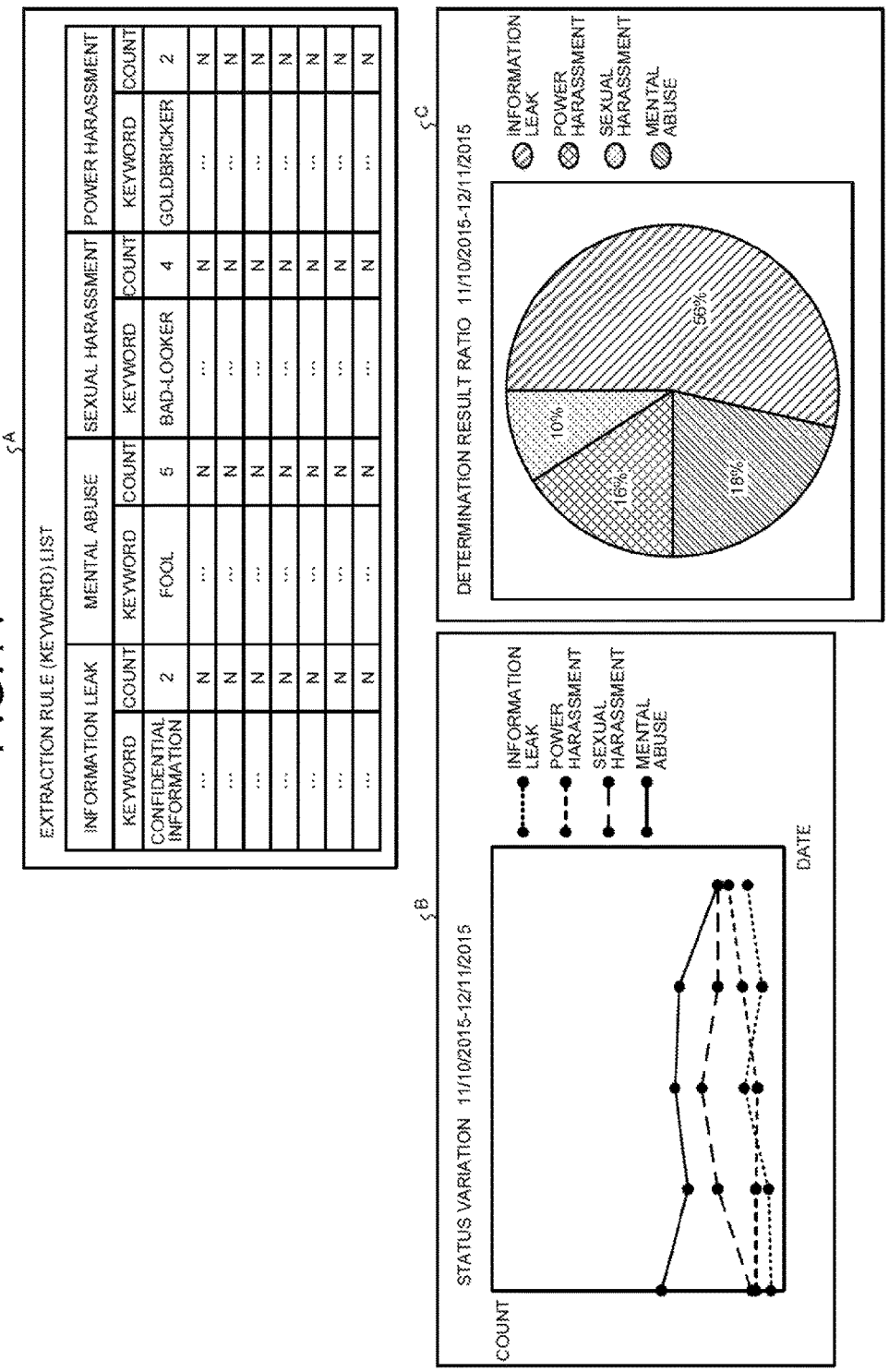
FIG. 14 is a diagram for explaining a display example of a mail determination result.

FIG. 14 is a diagram for explaining a display example of a mail determination result. As illustrated in FIG. 14, when a display instruction for displaying the determination result of electronic mails is received, the display control unit 31 can count the risk degree determination results and the learning results for the user-specified period and display the counting result.

For example, as illustrated in FIG. 14, the display control unit 31 displays the extraction count of the extracted keywords (the relevant keywords, the excluded keywords, and the impermissible keywords) of each category over a specified period of time from Nov. 10, 2015 to Dec. 11, 2015 (see A in FIG. 14). Moreover, as a result of counting the extraction count of each extracted keyword over the specified period of time from Nov. 10, 2015 to Dec. 11, 2015, the display control unit 31 can calculate the total extraction count of the extracted keywords of each category and display a line graph for each category so as to display the status transition of the extraction count (see B in FIG. 14). Moreover, the display control unit 31 can display the details of the line graphs in a pie chart (see C in FIG. 14).

Risk Degree Status

Figure 15:
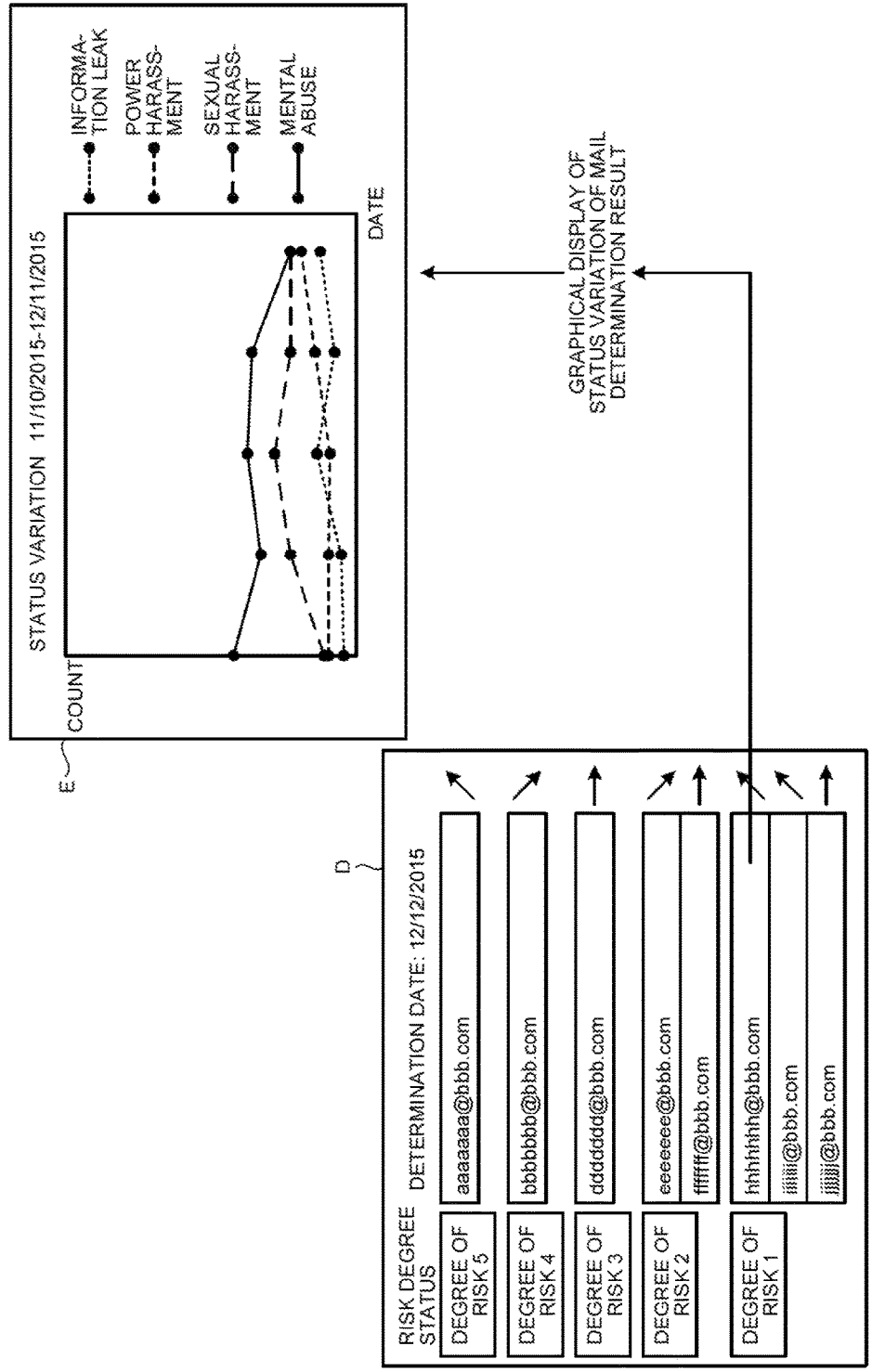
FIG. 15 is a diagram for explaining a display example of a risk degree status.

FIG. 15 is a diagram for explaining a display example of the risk degree status. As illustrated in FIG. 15, when a display instruction for displaying the risk degree status is received, the display control unit 31 can display the latest risk degree determination result. Apart from displaying the latest risk degree determination result, the display control unit 31 can also display the determination results for the specified period in the past, and can also display the transition of the determination results.

For example, as the determination result of the latest determination date (Dec. 12, 2015), the display control unit 31 can display the risk degree status indicating the degree of risk, the source mail address, and the determination transition in a corresponding manner (see D in FIG. 15). The determination transition represents information indicating whether or not the degree of risk has increased as compared to the previous instance. When the degree of risk has increased as compared to the previous instance, an upward arrow is displayed. When the degree of risk has decreased as compared to the previous instance, a downward arrow is displayed. When the degree of risk has not changed since the previous instance, a horizontal arrow is displayed.

Moreover, when the selection of a mail address displayed in the risk degree status is extracted, the display control unit 31 can also display a line graph indicating the transition of the category classification result (the category classification count) over the period of time (from Nov. 10, 2015 to Dec. 11, 2015) treated as the target for determination according to the determination date (Dec. 12, 2015) (see E in FIG. 15). Meanwhile, instead of displaying the category classification result, the display control unit 31 can display the body text of the concerned electronic mail. Herein, although the explanation is given with reference to the source mail addresses, identical operations can also be performed with respect to the destination mail addresses or with respect to pairs of source mail addresses and destination mail addresses.

Risk Degree Display

Figure 16:
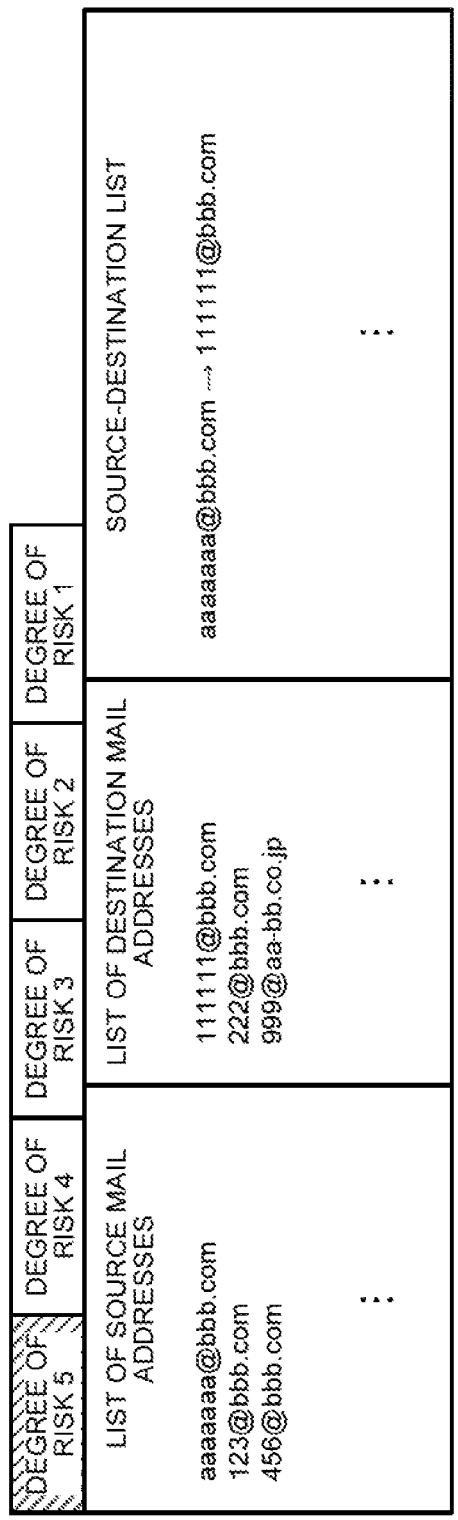
FIG. 16 a diagram for explaining an example of display regarding each degree of risk.

FIG. 16 a diagram for explaining an example of display regarding each degree of risk. As illustrated in FIG. 16, upon receiving an instruction for displaying the degree of risk, the display control unit 31 can display a list of concerned mail addresses corresponding to each degree of risk according to the latest risk degree determination result. Apart from displaying the latest risk degree determination result, the display control unit 31 can also display the determination results for the specified period in the past.

In the example illustrated in FIG. 16, the display control unit 31 displays a screen in response to the selection of the tab of the degree of risk 5, and displays a list of source mail addresses, a list of destination mail addresses, and a source-destination list corresponding to the degree of risk 5. When a tab change is received, the display control unit 31 changes the display to the list of addresses corresponding to another degree of risk.

Figure 17:
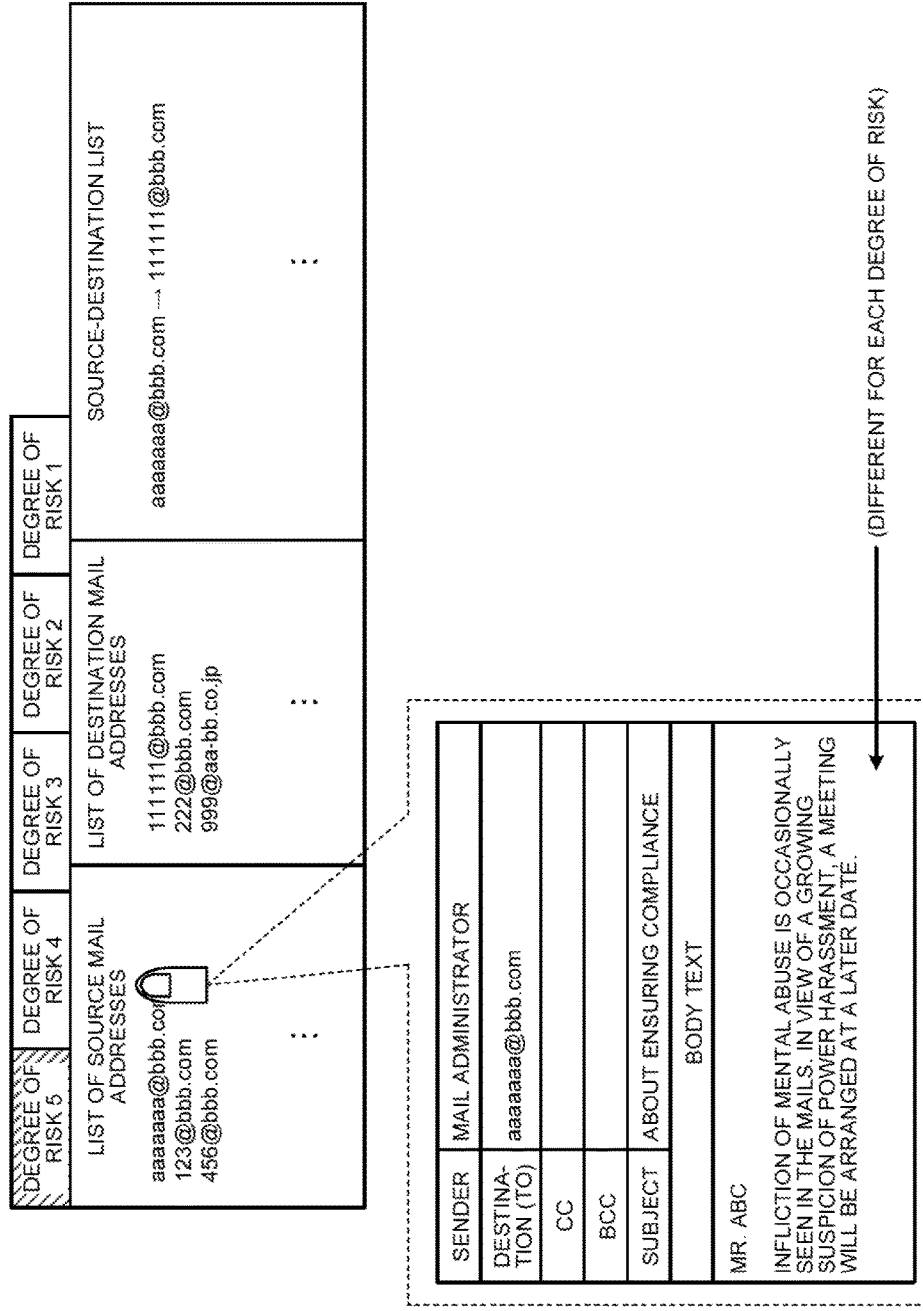
FIG. 17 is a diagram for explaining an example of creating a warning mail.

When a mail address is selected in this state, the display control unit 31 can also automatically create and send a warning mail. FIG. 17 is a diagram for explaining an example of creating a warning mail. As illustrated in FIG. 17, when a source mail address "aaaaaaa@bbb.com" determined to have the degree of risk 5 is selected, the display control unit 31 automatically generates a warning mail addressed to "aaaaaaa@bbb.com".

The body text of the created warning mail can be automatically varied according to the degree of risk, the mail address, and the classification status. For example, higher the degree of risk, the higher is the possibility of violating a law. Hence, the display control unit 31 creates the contents issuing a more severe warning. As an example, regarding the degree of risk 5, the display control unit 31 creates contents indicating measures such as taking a legal action or arranging a meeting. In contrast, regarding the degree of risk 1, the display control unit 31 creates contents prompting precautions in the usage of words.

With respect to a source mail address, the display control unit 31 creates a warning message as explained above. With respect to a destination mail address, the display control unit 31 creates a message having the contact information of the administrator 5 or the consultation desk and prompting consultation. With respect to a combination of addresses, the display control unit 31 creates a message about scheduling a dialogue between the two concerned persons along with a third party.

Meanwhile, the display control unit 31 can also create various messages with respect to the category having the highest category classification count with respect to the selected mail addresses. Moreover, the display control unit 31 can also create a warning mail for each category for which the category classification count with respect to the selected mail addresses exceeds a threshold value. Even when a mail address specified in the risk degree status illustrated in FIG. 15 (see E in FIG. 15) is selected, the display control unit 31 can create a warning mail.

Appearance Status

Figure 18:
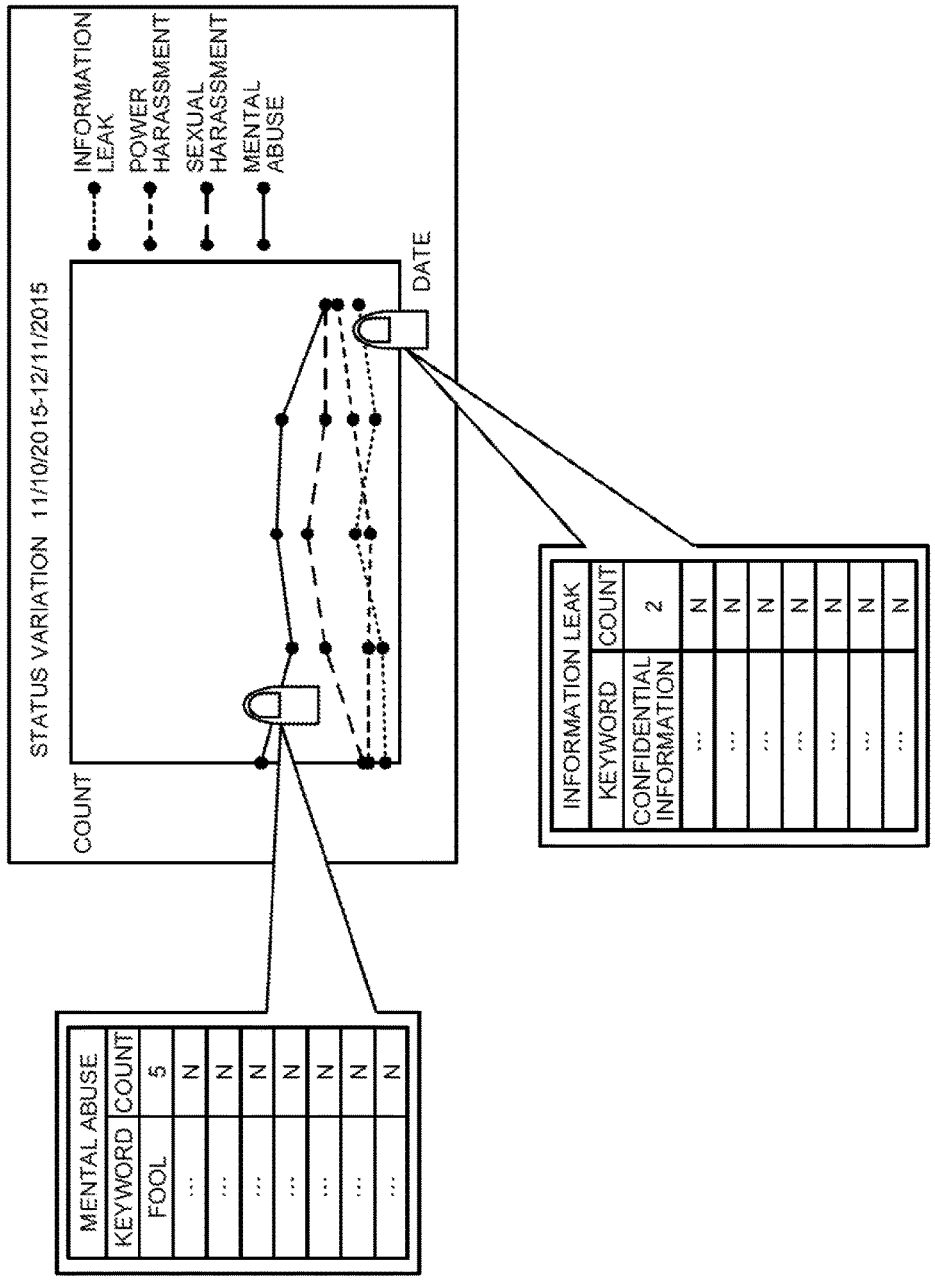
FIG. 18 is a diagram for explaining an example of displaying the appearance status of keywords from a graph.

FIG. 18 is a diagram for explaining an example of displaying the appearance status of keywords from a graph. As illustrated in FIG. 18, when any one line graph is selected from among the line graphs representing the status transition of the category-by-category extraction counts (see B in FIG. 14), the display control unit 31 can display the extraction count of each extracted keyword of each category.

In the example illustrated in FIG. 18, when the selection of the graph regarding the category "mental abuse" is extracted, the display control unit 31 displays the extraction count of each keyword of the category "mental abuse". In an identical manner, when the selection of the graph regarding the category "information leak" is extracted, the display control unit 31 displays the extraction count of each keyword of the category "information leak". Meanwhile, the extraction count displayed herein is the count of extraction taken within the specified period of time displayed in the graph of status variation.

Transition of Extraction Before and After Learning

Figure 19:
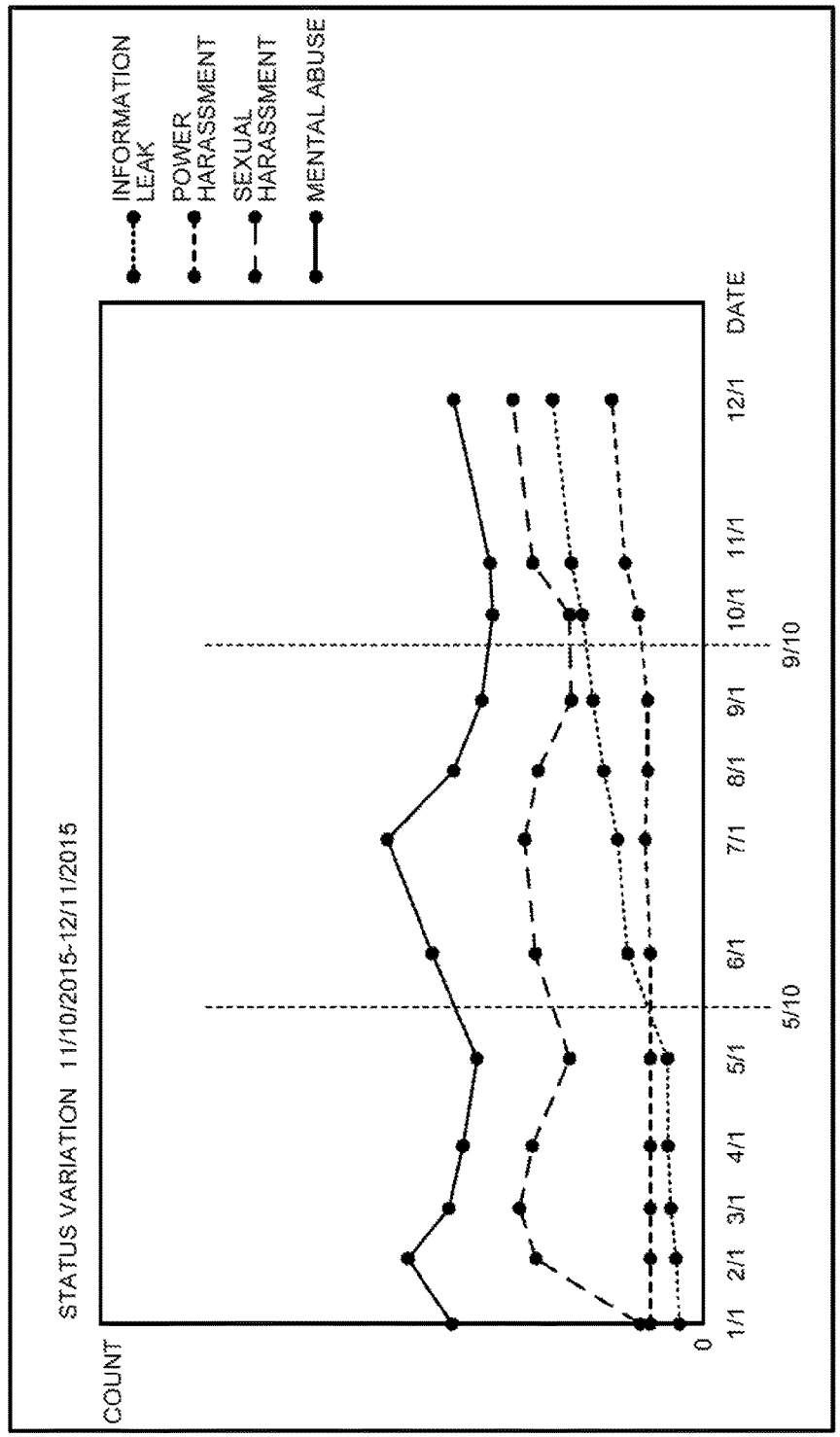
FIG. 19 is a diagram for explaining an example of displaying the transition of extraction before and after the updating of the extraction condition.

FIG. 19 is a diagram for explaining an example of displaying the transition of extraction before and after the updating of the extraction condition. As illustrated in FIG. 19, in the line graphs indicating the status transition of the category-by-category extraction counts (see B in FIG. 14), the display control unit 31 puts the dates on which the relevant keywords representing the extraction condition are updated as a result of performing the learning operation explained in the first embodiment.

In the example illustrated in FIG. 19, it is displayed that the extraction condition is updated on the dates May 10 and September 10. As a result of performing such display, the transition of the extraction counts can be understood before and after the updating of the extraction condition. For example, in the example illustrated in FIG. 19, prior to the updating of the extraction condition, the extraction count is decreasing for each category. However, after the updating of the extraction condition, the extraction count is increasing. That is because of the following reason. The keywords used in each category change on a daily basis due to the changes of the times and the fashion, and the violators also learn on a daily basis. Hence, as a result of continuously using the same extraction condition, the extraction count goes on decreasing. As a result, if the extraction condition is updated on a periodic basis, it becomes possible to follow the learning of the violators, and an improvement in the extraction count can be expected.

Meanwhile, when the period prior to the updating of the extraction condition is selected, the display control unit 31 displays the pre-updating extraction condition. When the period after the updating of the extraction condition is selected, the display control unit 31 displays the post-updating extraction condition. Moreover, in the post-updating extraction condition, the display control unit 31 can also display the deleted keywords or the added keywords.

Effect

The mail server 10 according to the second embodiment can display the learning result and the degree of risk. That enables understanding of the transmission status of the electronic mails causing compliance violation, and the administrator can visually understand the degrees of risk and the risky users. Moreover, since the mail server 10 can provide interface of various perspectives, it leads to the enhancement in user-friendliness.

Furthermore, since the mail server 10 can display the periodic updating period of the extraction condition along with the classification transition, it can provide a benchmark to determine whether or not the learning of violators is tracked. As a result, the administrator 5 can consider revising the learning period and the learning method, and take measures to proactively prevent the transmission of risky mails.

Moreover, the mail server 10 can feed back the classification result for each mail address, thereby enabling enhancement in the moral of the employees and enabling evaluation of the morale of the employees.

[c] Third Embodiment

Meanwhile, although the present invention has been described with reference to the abovementioned embodiments, it is also possible to implement the invention in various forms other than the abovementioned embodiments.

Numerical Values, Classification

The category classification count, the category names, the number of divisions of the degree of risk, and the determination criteria for the degree of risk explained in the embodiments can be changed in an arbitrary manner. Moreover, although line graphs and pie charts are illustrated in the second embodiment, those are not the only possible graphs. Alternatively, it is possible to use bar graphs or other types of graphs. Furthermore, excluded keywords and impermissible keywords can be set in common among all categories.

System

The constituent elements of the device illustrated in FIGS. 2 and 11 are merely conceptual, and need not be physically configured as illustrated. The constituent elements can be separated or integrated in arbitrary units. For example, the learning unit 24 and the risk degree determining unit 30 can be integrated together. Moreover, the process functions performed by the device can be entirely or partially realized by a central processing unit (CPU) or computer programs that are analyzed and executed by the CPU, or can be realized as hardware by wired logic.

Furthermore, of the processes described in the embodiments, all or part of the processes explained as being performed automatically can be performed manually. Similarly, all or part of the processes explained as being performed manually can be performed automatically by a known method. Furthermore, processing procedures, control procedures, specific names, and the information including various types of data and parameters as described in the above specifications and the drawings may be optionally changed except as otherwise noted.

Hardware

Figure 20:
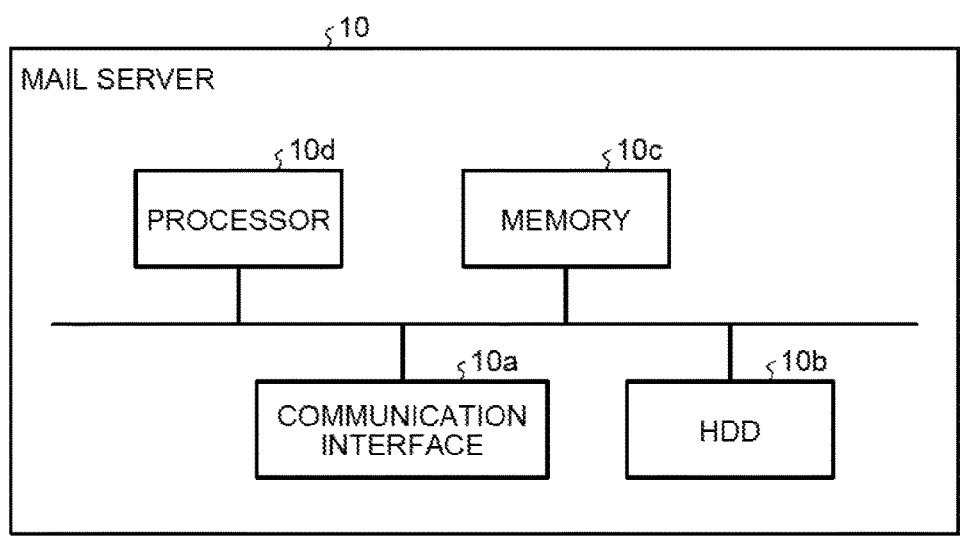
FIG. 20 is a diagram for explaining an exemplary hardware configuration.

For example, the mail server 10 can be implemented using a computer having the following hardware configuration. FIG. 20 is a diagram for explaining an exemplary hardware configuration. As illustrated in FIG. 20, the mail server 10 includes a communication interface 10a, a hard disk drive (HDD) 10b, a memory 10c, and a processor 10d.

Examples of the communication interface 10a includes a network interface. The HDD 10b is a memory device used in storing the various databases illustrated in FIG. 2.

Examples of the memory 10c include a random access memory (RAM) such as a synchronous dynamic random access memory (SDRAM); a read only memory (ROM); or a flash memory. Examples of the processor 10d include a CPU, a digital signal processor (DSP), a field programmable gate array (FPGA), and a programmable logic device (PLD).

The mail server 10 operates as an information processing device that reads and executes a computer program and implements the learning method. Thus, the mail server 10 executes a computer program that implements functions identical to the receiving unit 21, the classification determining unit 22, the sending unit 23, the learning unit 24, the risk degree determining unit 30, and the display control unit 31. As a result, the mail server 10 can execute processes that implement functions identical to the receiving unit 21, the classification determining unit 22, the sending unit 23, the learning unit 24, the risk degree determining unit 30, and the display control unit 31. Meanwhile, the computer program mentioned herein is not limited to the computer program executed by the mail server. For example, even in the case in which another computer or another server executes the computer program or in the case in which the computers and servers execute the computer program in cooperation, the invention can be implemented in an identical manner.

The computer program can be distributed via a network such as the Internet. Alternatively, the computer program can be recorded in a computer-readable recording medium such as a hard disk, a flexible disk (FD), a compact disk read only memory (CD-ROM), a magneto-optical (MO) disk, or a digital versatile disk (DVD). The computer can read the computer program from the recording medium and execute it.

According to one aspect of the embodiment, it becomes possible to understand the transmission status of the electronic mails that cause compliance violation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a display control program that causes a computer to execute a process comprising:
receiving a mail from a source address;
first determining whether the mail received is an inappropriate mail by second determining whether the mail matches with an extraction condition for inappropriate mails, and storing in a storage unit a result of the first determining with the source address, a destination address to which the mail is addressed, or a pair of the source address and the destination address;
receiving an instruction to display risk degree status from a user;
displaying a list of source addresses of inappropriate mails that are determined as the inappropriate mail, a source address among the source addresses in the list being classified into a level according to transition of a rate of receiving inappropriate mails from the source address, based on information stored in the storage unit;
receiving a selection of a source address in the list from the user;
displaying as a graph the transition of the rate of receiving inappropriate mails from the selected source address, based on the information stored in the storage unit, and displaying in the graph an updating timing that indicates that the extraction condition is updated; and generating a mail addressed to the selected source address, body text thereof being created according to a level into which the selected source address is classified.

2. The non-transitory computer-readable recording medium according to claim 1, wherein the displaying the list includes displaying a list of destination addresses to which inappropriate mails are transmitted, a destination address among the destination addresses in the list being classified into a level according to a rate of inappropriate mails being transmitted to the destination address, or displaying a list of pairs of a source address and a destination address, a pair being classified into a level according to a rate of inappropriate mails being transmitted from the source address to the destination address.

3. The non-transitory computer-readable recording medium according to claim 1, wherein the displaying the transition includes displaying the extraction condition or body text of an inappropriate mail matching with the extraction condition for the selected source address.

4. The non-transitory computer-readable recording medium according to claim 1, wherein the displaying the transition includes generating a mail addressed to the selected source address.

5. A display control method comprising:
receiving a mail from a source address, using a processor;
first determining whether the mail received is an inappropriate mail by second determining whether the mail matches with an extraction condition for inappropriate mails, and storing in a storage unit a result of the first determining with the source address, a destination address to which the mail is addressed, or a pair of the source address and the destination address, using the processor;
receiving an instruction to display risk degree status from a user, using the processor;
displaying a list of source addresses of inappropriate mails that are determined as the inappropriate mail, a source address among the source addresses in the list being classified into a level according to transition of a rate of receiving inappropriate mails from the source address, based on information stored in the storage unit, using the processor;
receiving a selection of a source address in the list from the user, using the processor;
displaying as a graph the transition of the rate of receiving inappropriate mails from the selected source address, based on the information stored in the storage unit, and displaying in the graph an updating timing that indicates that the extraction condition is updated, using the processor; and
generating a mail addressed to the selected source address, body text thereof being created according to a level into which the selected source address is classified, using the processor.

6. An information processing device comprising:
a processor that executes a process including:
receiving a mail from a source address;
first determining whether the mail received is an inappropriate mail by second determining whether the mail matches with an extraction condition for inappropriate mails, and storing in a storage unit a result of the first determining with the source address, a destination address to which the mail is addressed, or a pair of the source address and the destination address;
receiving an instruction to display risk degree status from a user;
displaying a list of source addresses of inappropriate mails that are determined as the inappropriate mail, a source address among the source addresses in the list being classified into a level according to transition of a rate of receiving inappropriate mails from the source address, based on information stored in the storage unit;
receiving a selection of a source address in the list from the user;
displaying as a graph the transition of the rate of receiving inappropriate mails from the selected source address, based on the information stored in the storage unit, and displaying in the graph an updating timing that indicates that the extraction condition is updated; and
generating a mail addressed to the selected source address, body text thereof being created according to a level into which the selected source address is classified.

* * * * *